Feb. 6, 1923.

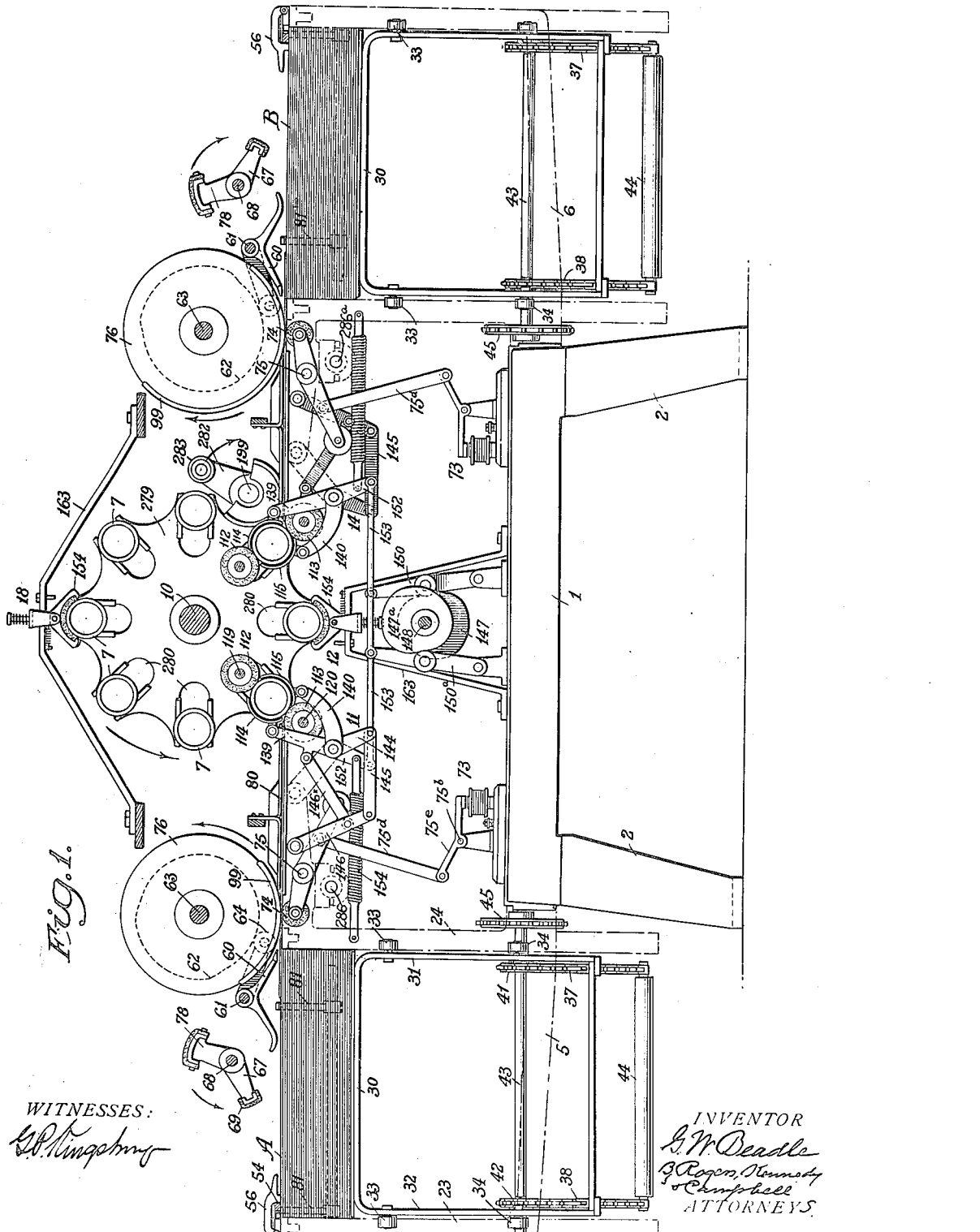

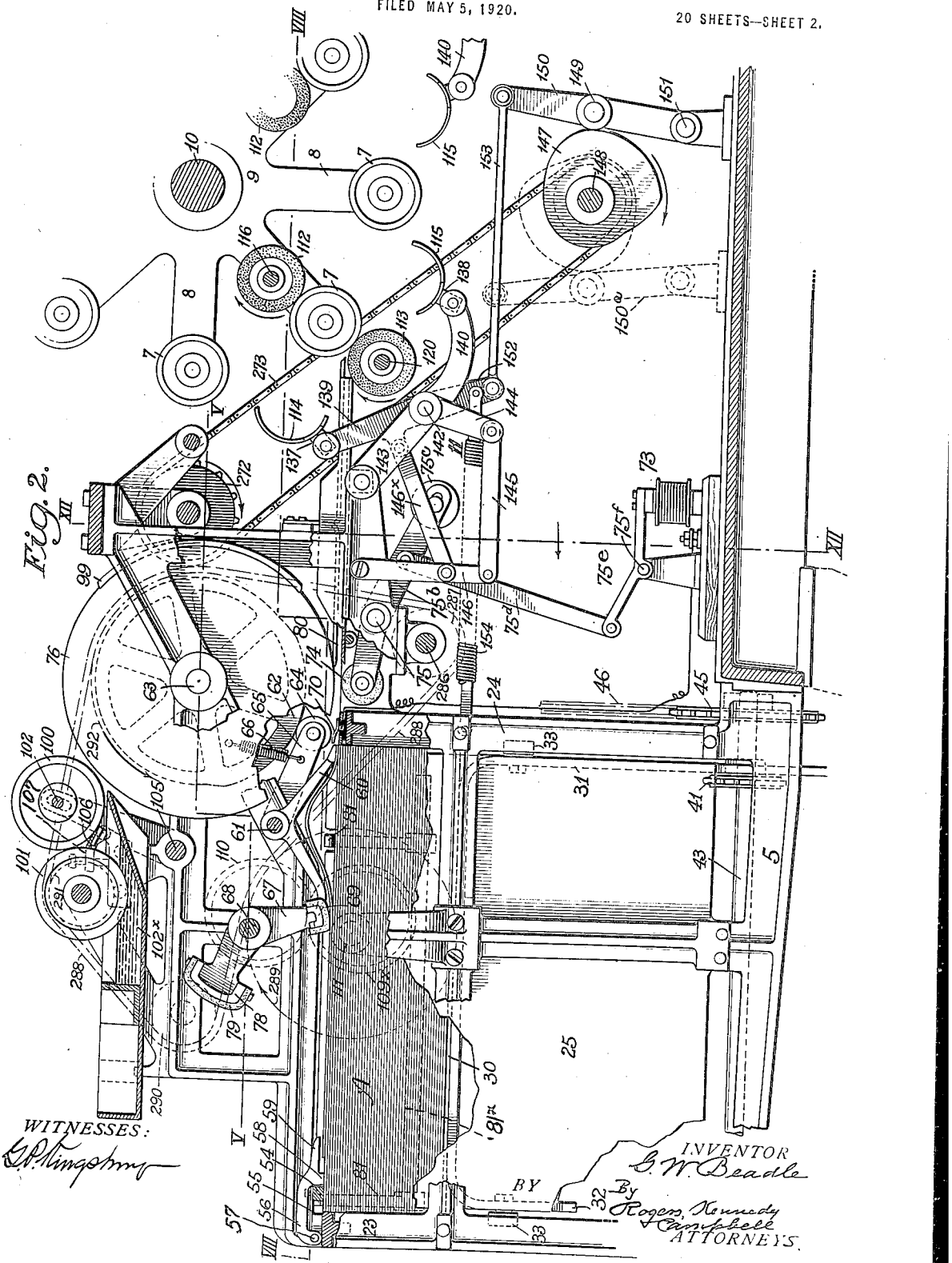

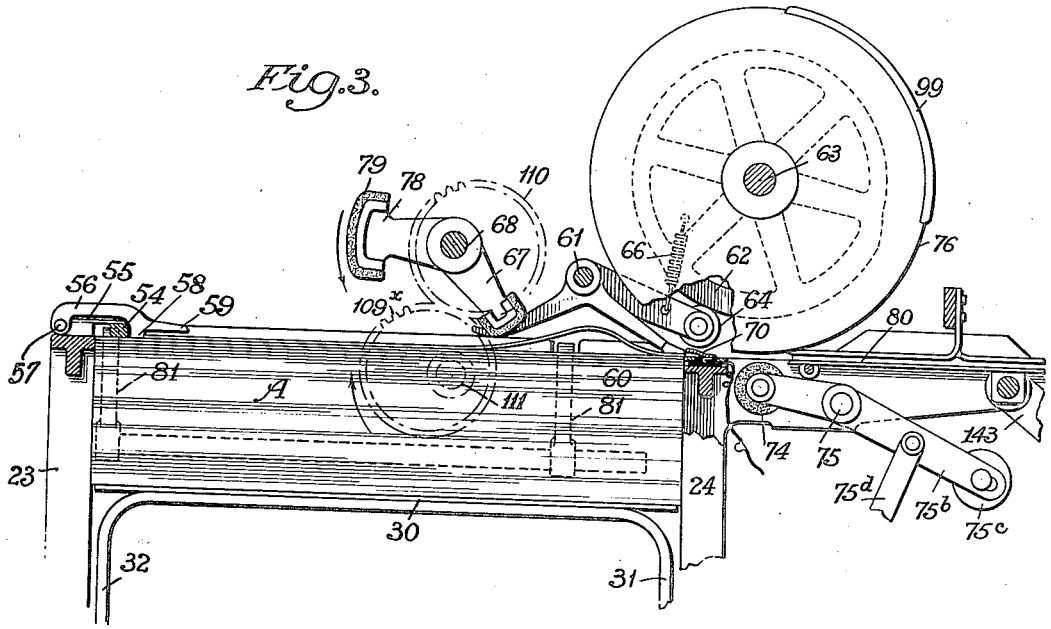
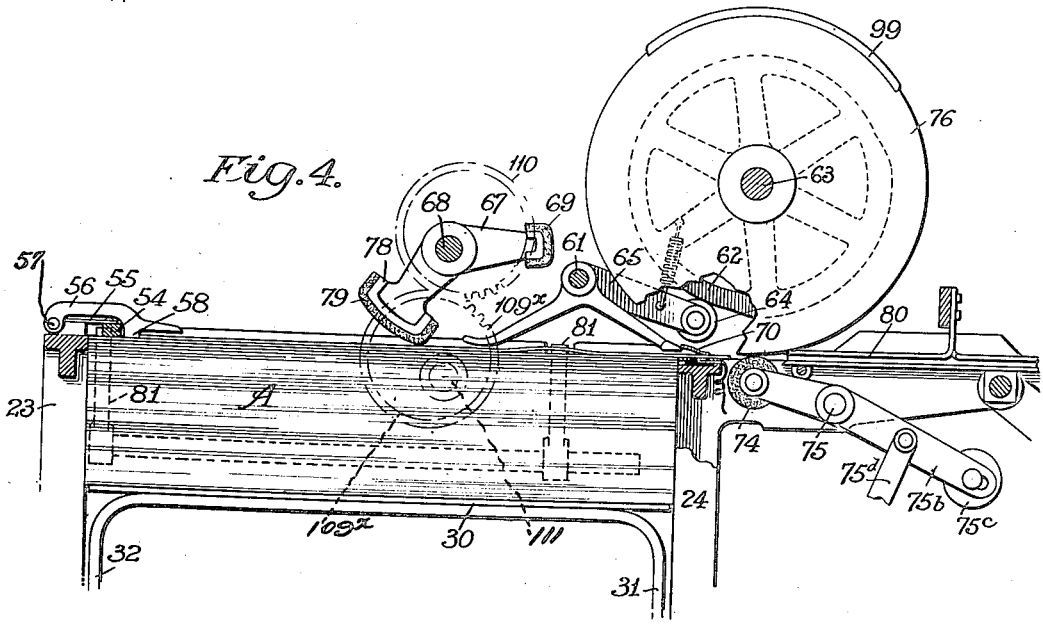

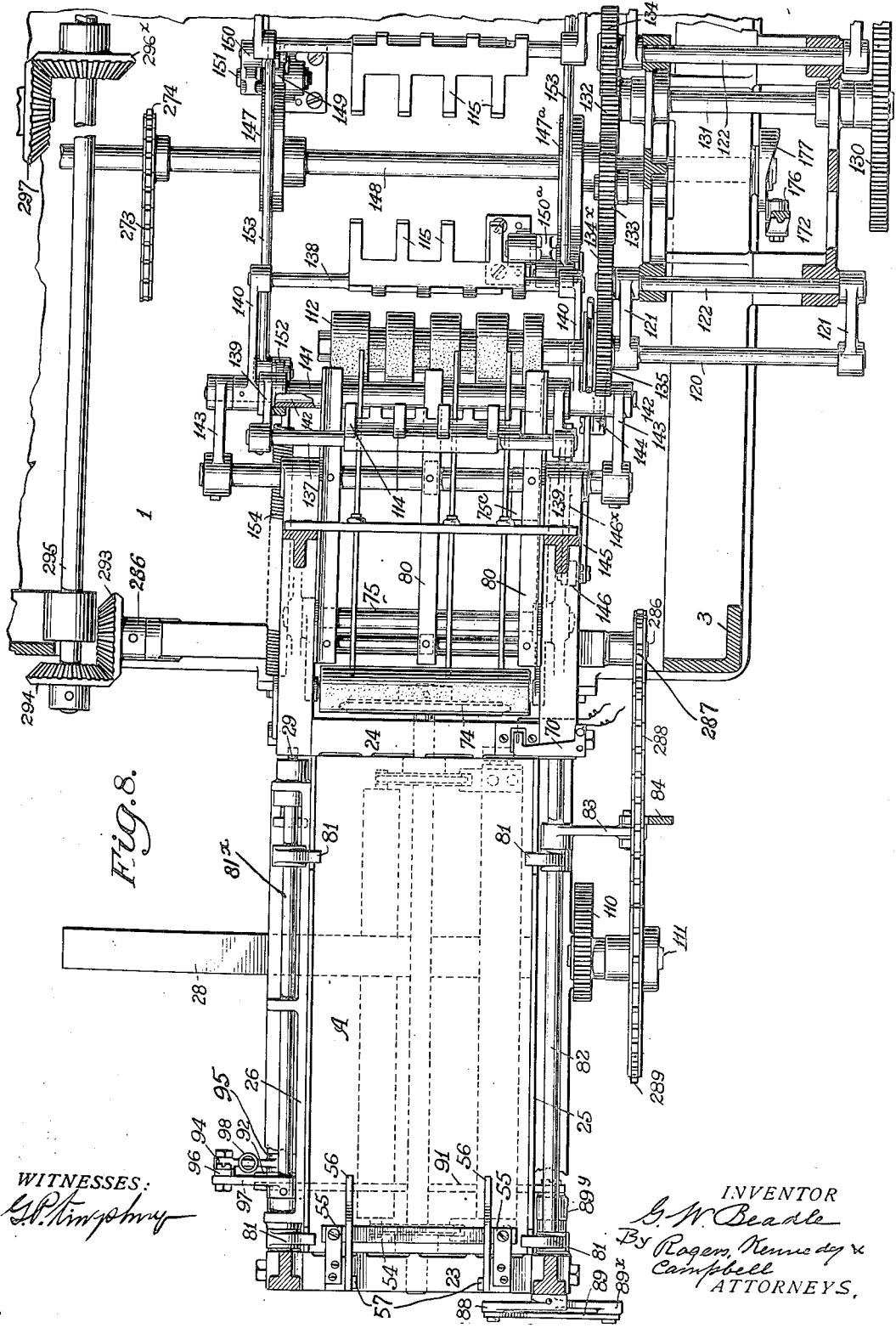

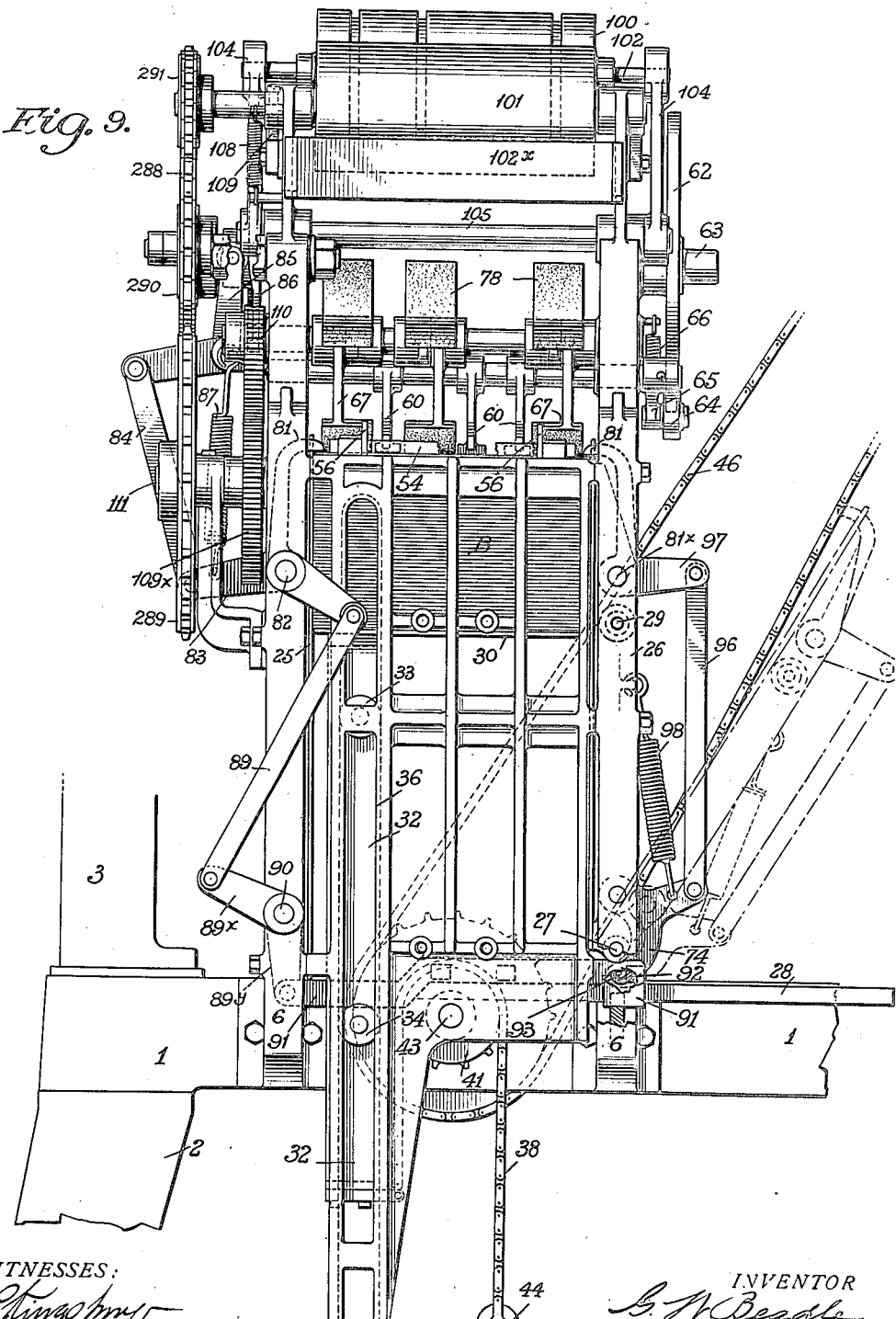

G. W. BEADLE.
MACHINE FOR MAKING TUBULAR ARTICLES.
FILED MAY 5, 1920.

WITNESSES:

INVENTOR
G. W. Beadle
BY
Rogers, Kennedy Campbell
ATTORNEYS.

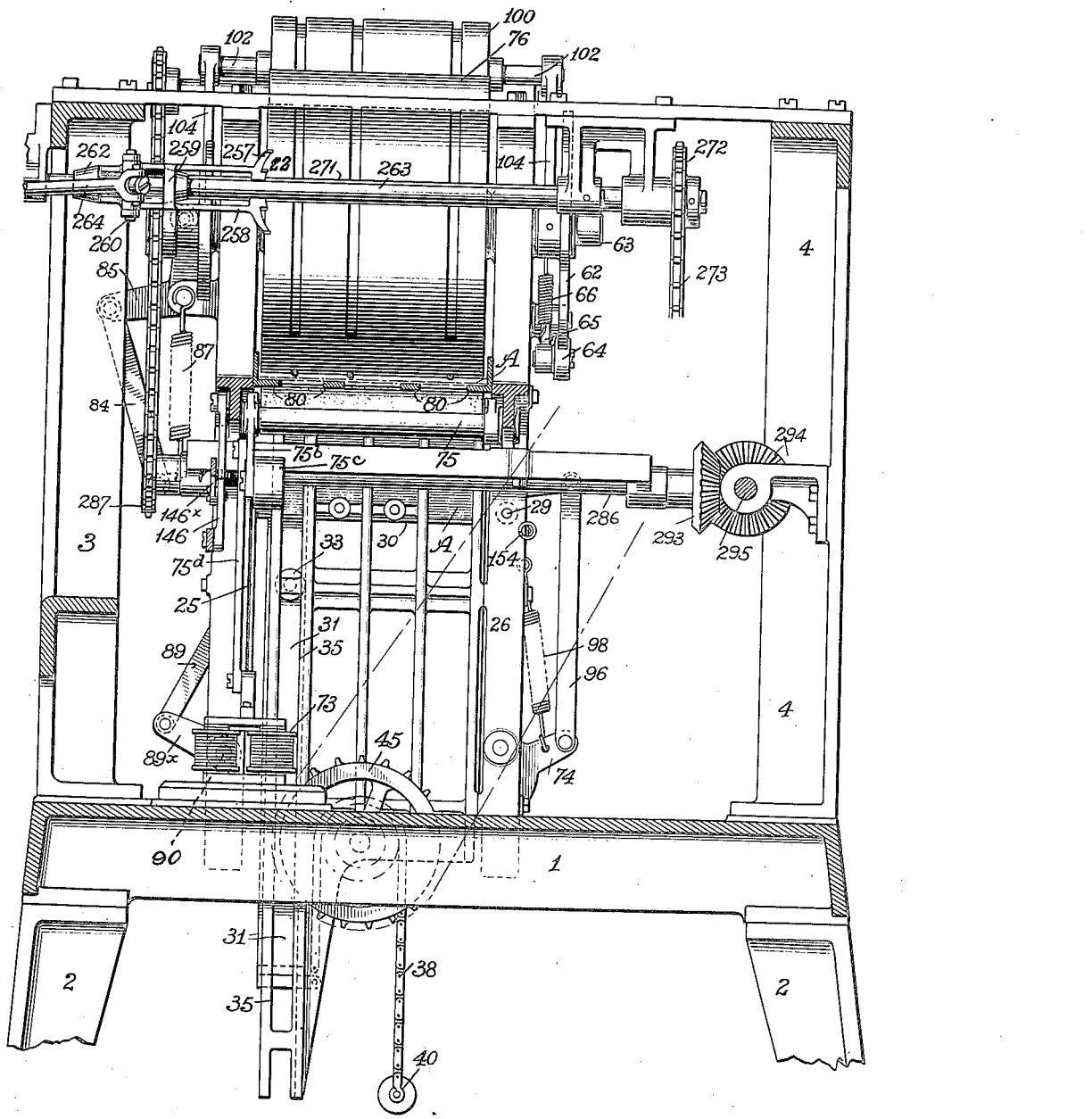

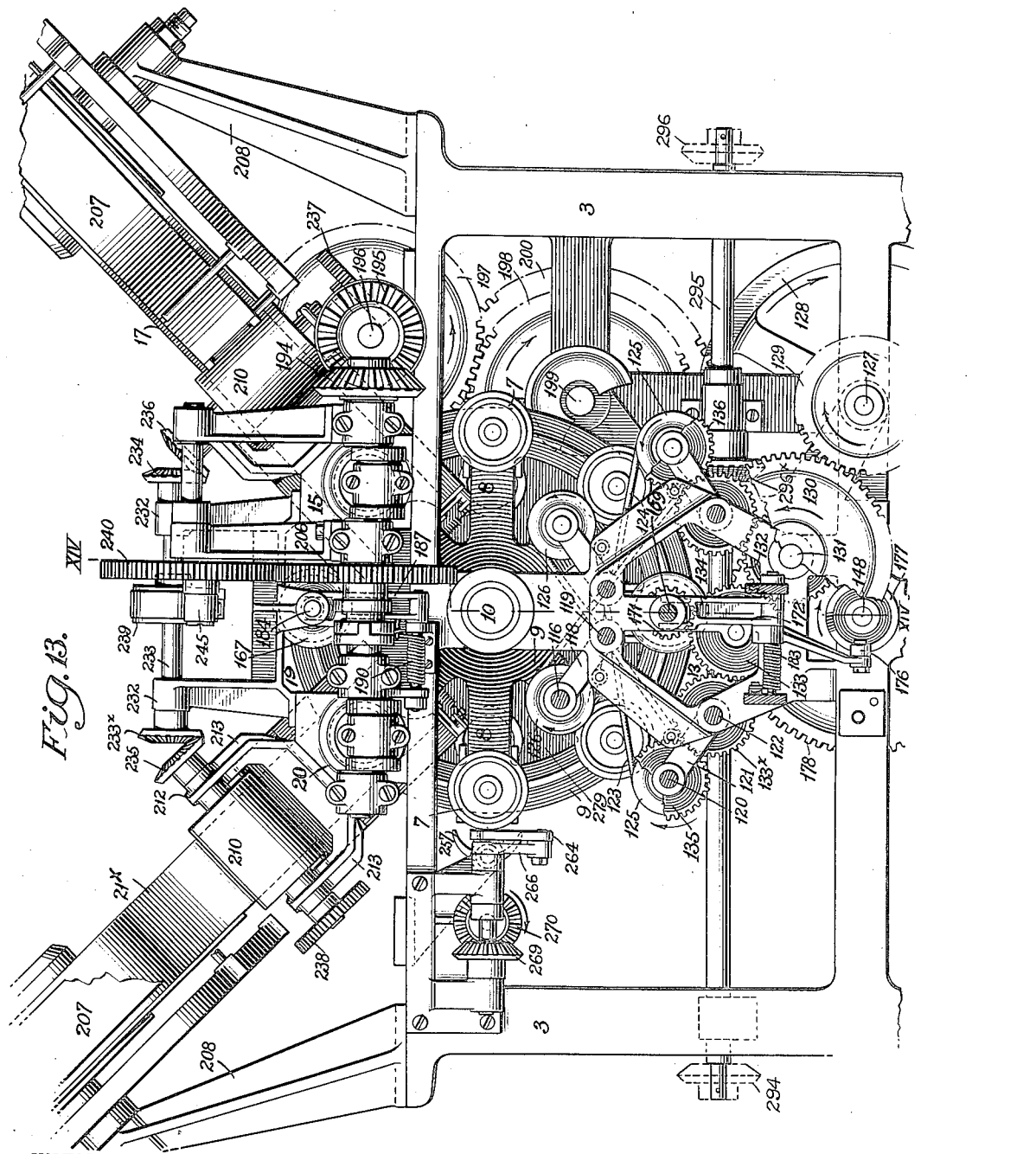

Feb. 6, 1923.

G. W. BEADLE.
MACHINE FOR MAKING TUBULAR ARTICLES.
FILED MAY 5, 1920.

WITNESSES:

INVENTOR
G. W. Beadle
By Rogers, Kennedy Campbell
ATTORNEYS.

Feb. 6, 1923.

G. W. BEADLE.
MACHINE FOR MAKING TUBULAR ARTICLES.
FILED MAY 5, 1920.

WITNESSES:

INVENTOR
G. W. Beadle
BY
Rogers, Kennedy & Campbell
ATTORNEYS

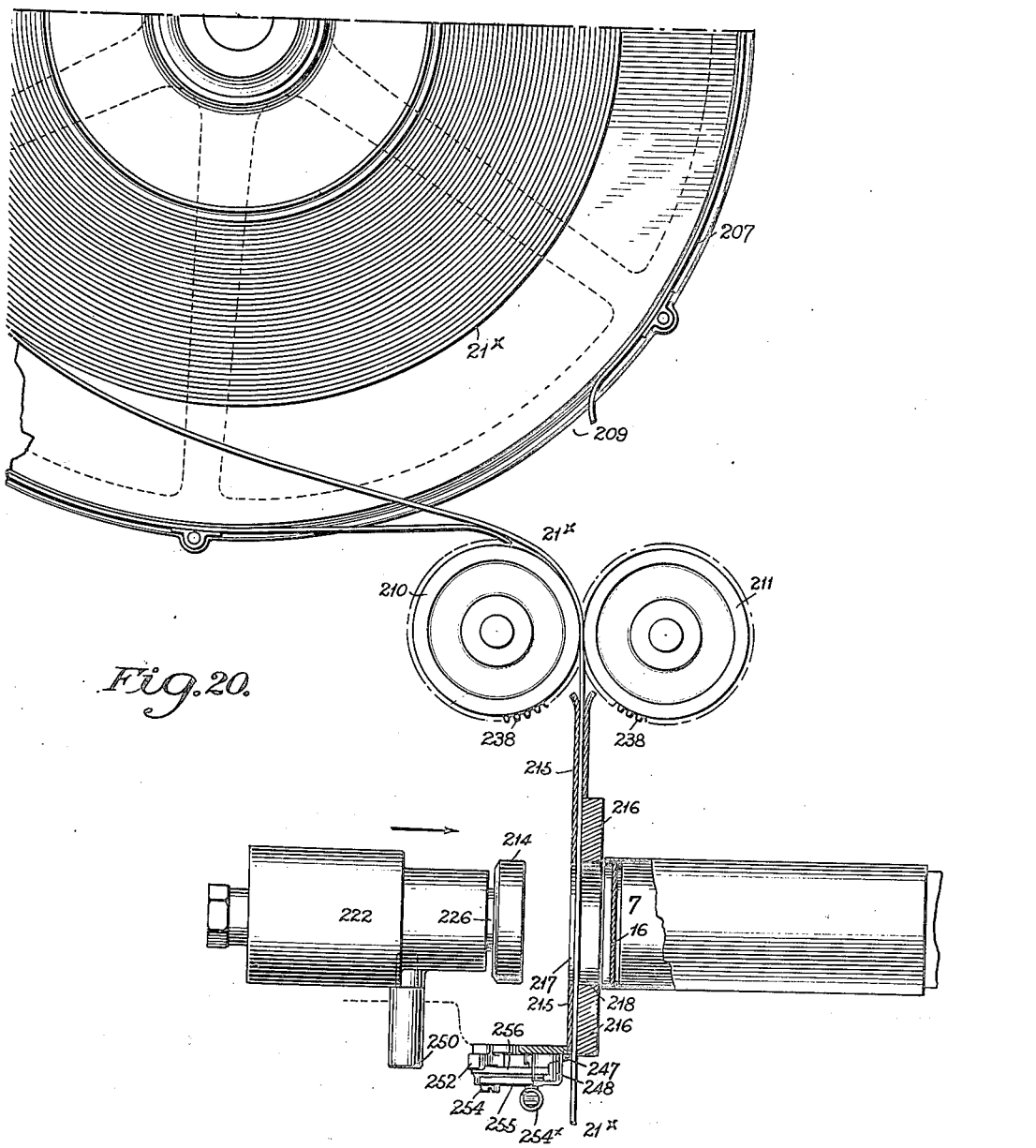

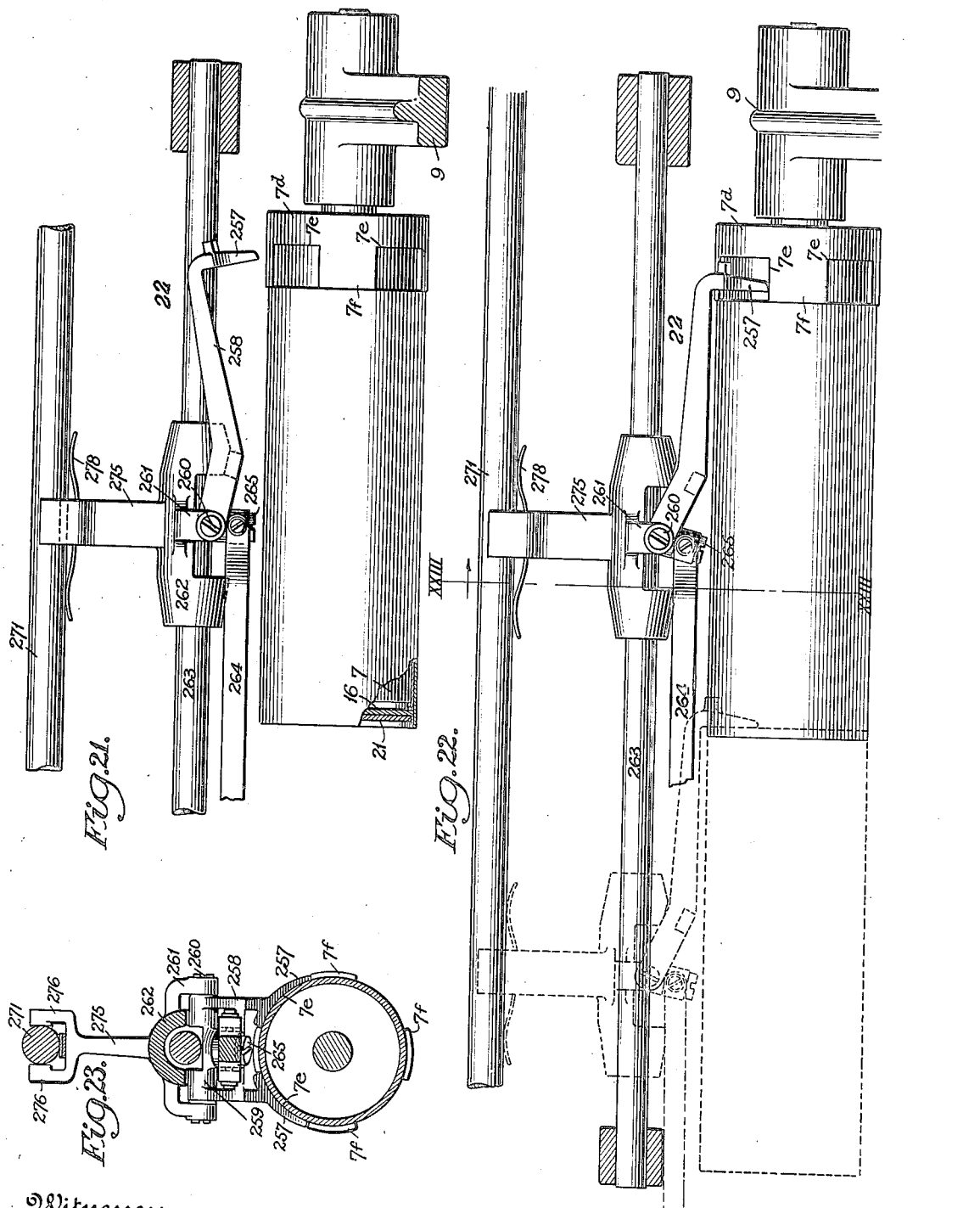

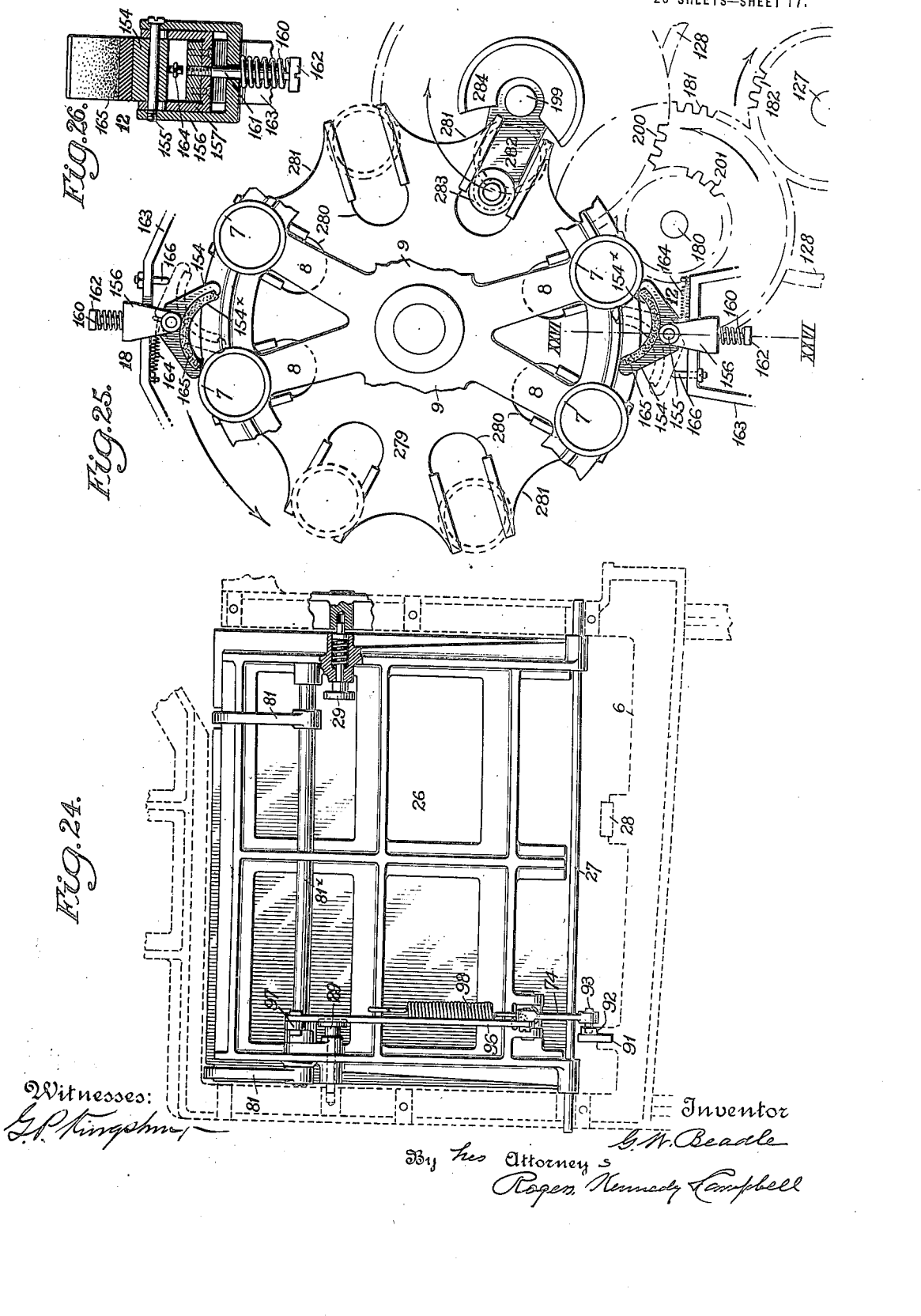

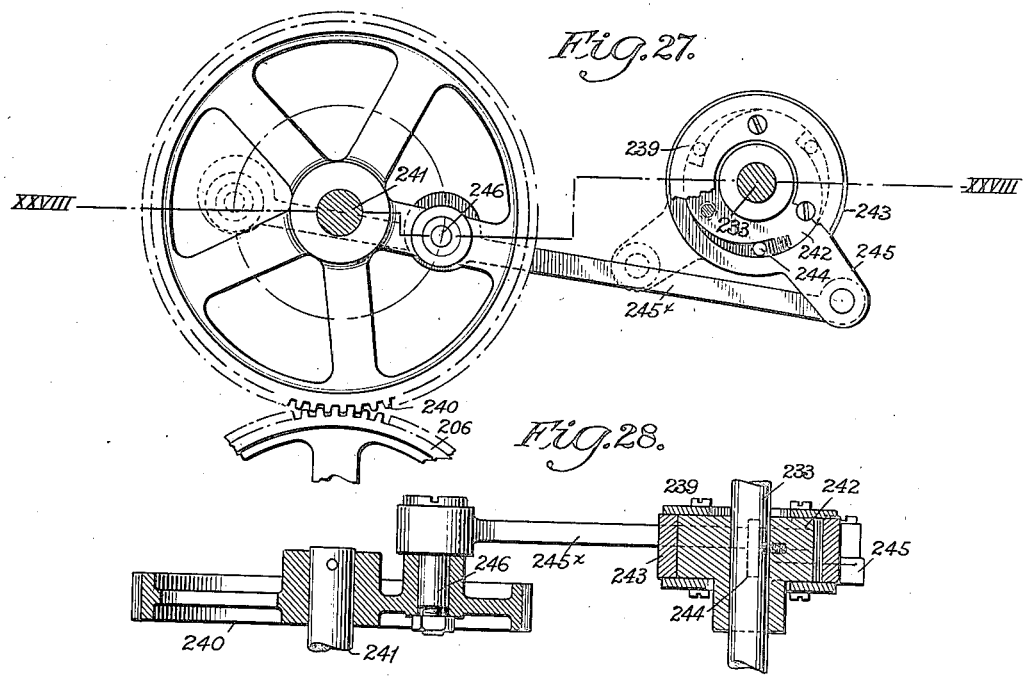
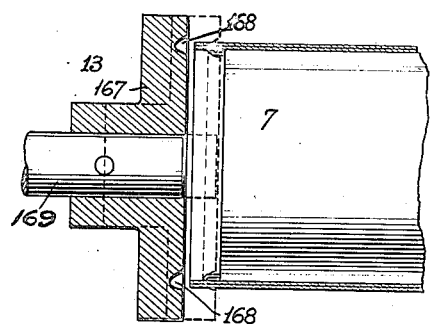

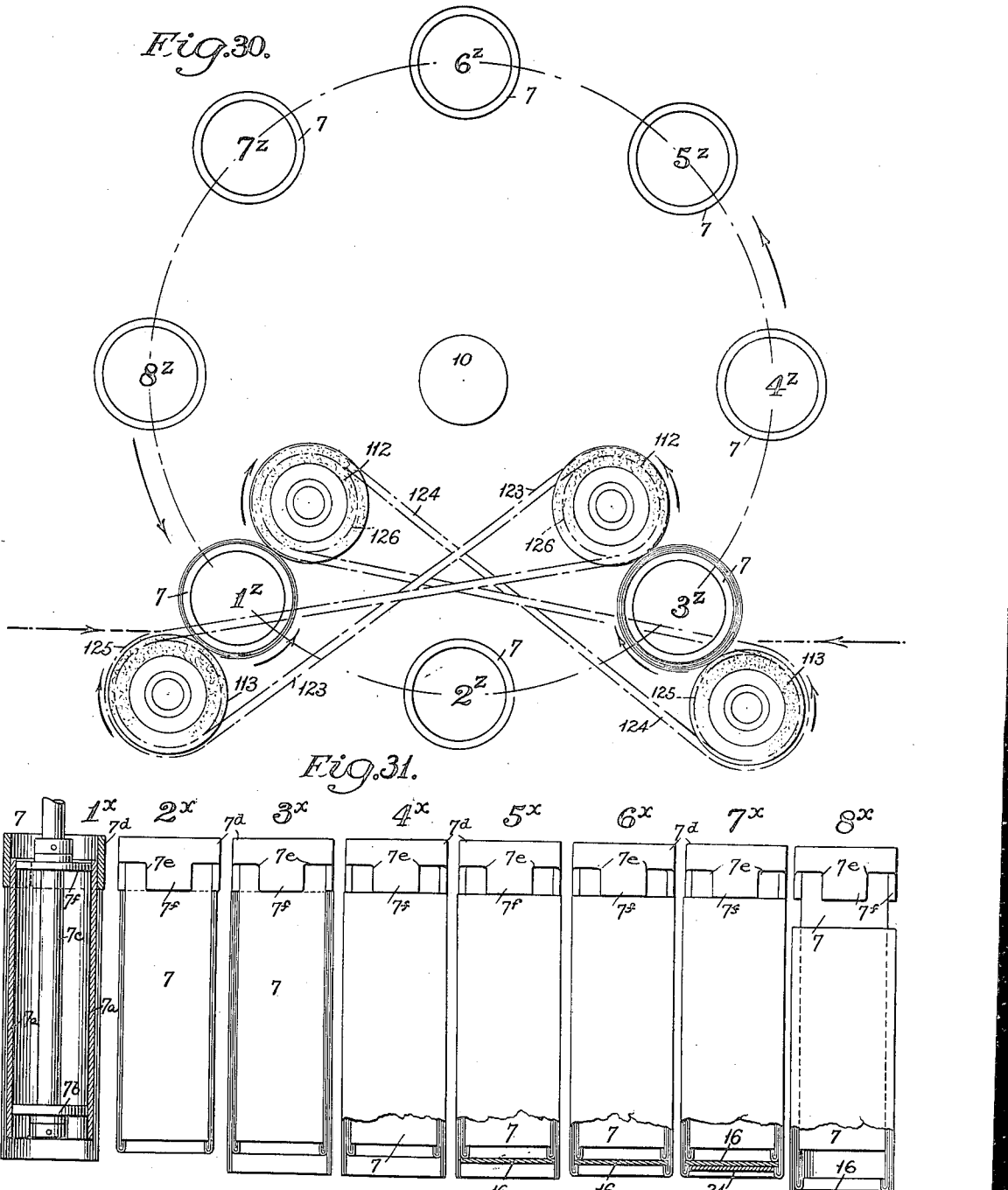

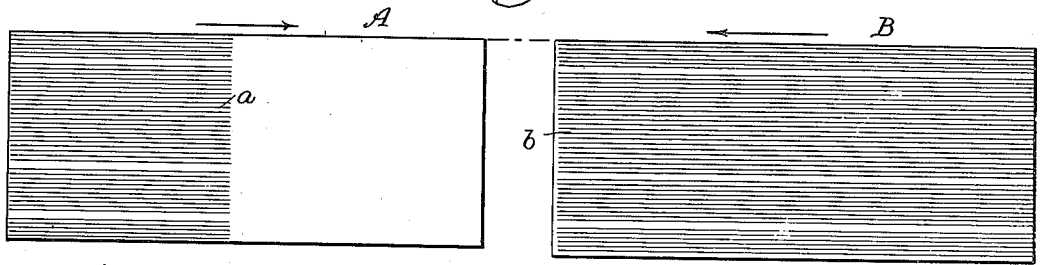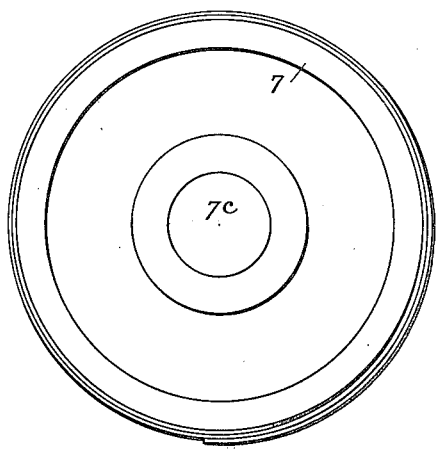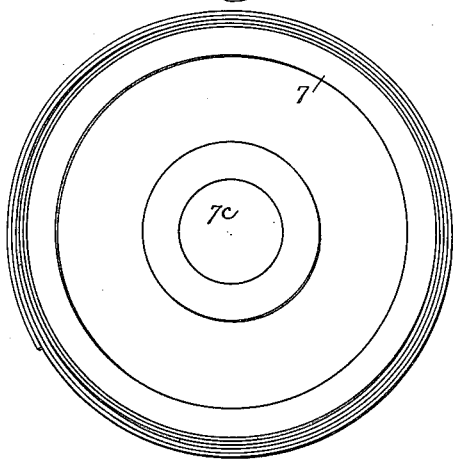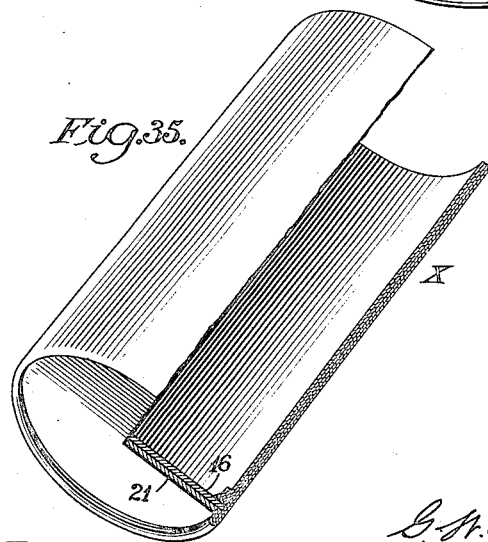

Patented Feb. 6, 1923.

1,444,096

UNITED STATES PATENT OFFICE.

GEORGE W. BEADLE, OF STAMFORD, CONNECTICUT, ASSIGNOR TO INTERNATIONAL PAPER COMPANY, A CORPORATION OF NEW YORK.

MACHINE FOR MAKING TUBULAR ARTICLES.

Application filed May 5, 1920. Serial No. 378,993.

*To all whom it may concern:*

Be it known that I, GEORGE W. BEADLE, a citizen of the United States, residing at Stamford, in the county of Fairfield and State of Connecticut, have invented certain new and useful Improvements in Machines for Making Tubular Articles, of which the following is a specification, reference being had therein to the accompanying drawing.

This invention relates to machines for making tubular articles, such as paper cartons or receptacles, the object of the invention being to provide a machine which will operate on separate blanks and form them into tubular cartons closed at one end by a bottom and open at the opposite end, and which machine will perform its operations on a number of cartons at the same time in different progressive stages of formation, and will operate continuously and automatically and produce the cartons speedily and in large numbers for a given period of operation.

The carton formed by my improved machine consists of a tubular body made up of two separate sheets or blanks coiled or wound one upon the other and cemented or glued together, the inner wound blank having its end folded in and producing a shoulder within the outer blank, against which shoulder a disk-like bottom is seated, and the end of the outer blank being folded in and abutted against the bottom to hold it in place, and a second bottom or locking disk being seated within the folded-in end of the outer blank to prevent said end from unfolding.

My improved machine to form cartons of this construction, comprises a series of forming mandrels mounted on a carrier and movable together step by step; a blank extracting mechanism for extracting blanks one at a time from a blank holder; a blank feeding mechanism for feeding and presenting the extracted blanks to be first wound on the mandrel; an associated blank winding mechanism to wind said blanks around the mandrel; a blank spinning or folding mechanism to act on the end of the wound blank and fold said end inwardly; a second blank extracting mechanism; a second blank feeding mechanism for feeding and presenting the extracted blanks to be wound around the first; a blank winding mechanism associated with the said second blank feeding mechanism to wind the second blanks around the first; a mechanism for seating a bottom within the end of the outer wound blank and against the folded-in end of the inner blank; a second blank spinning or folding mechanism to act on the end of the outer blank and fold said end inwardly against the seated bottom; a second mechanism for seating a second bottom or locking disk within the folded-in end of the outer blank, which completes the formation of the carton; and an ejecting or stripping mechanism which acts on the finished carton on the mandrel and strips or ejects the same therefrom. These several mechanisms are operated in unison with each other while the mandrels are at rest between their step by step movements, so that a number of cartons are in different successive stages of formation at one time, and by the step by step movements of the mandrels, are presented in unison to the action of the different operating mechanisms above mentioned, with the result that the finished cartons will be discharged at intervals from the machine, corresponding to the step by step movements of the mandrels.

In the accompanying drawings:

Fig. 1 is a longitudinal sectional elevation of my improved machine with certain parts omitted.

Fig. 2 is a side elevation on an enlarged scale, partly in section, through one end of the machine, with certain parts broken away.

Fig. 3 is a side elevation of one of the blank extracting and feeding mechanisms.

Fig. 4 is a view similar to Fig. 3 with the parts in a different position.

Fig. 8 is a horizontal sectional plan view on the line VIII—VIII of Fig. 2.

Fig. 9 is an end elevation of the machine as viewed from the right in Fig. 1.

Fig. 12 is a vertical transverse section on the line XII—XII of Fig. 2, as viewed in the direction of the arrow cutting said line.

Fig. 13 is a front elevation of the central portion of the machine with the two end blank holders and their associated blank feeding mechanisms removed.

Fig. 16 is a vertical sectional view taken on the line XVI—XVI of Fig. 14, as viewed from the left, showing the two bottom punching and seating mechanisms and their associated cutting mechanisms for severing the waste material.

Fig. 20 is a fragmentary view of the roll of strip-material, the feeding rollers therefor, and the bottom punching mechanism, showing how the plunger punch acts to punch the bottoms from the strip.

Fig. 21 is a fragmentary view of one of the mandrels with the finished carton thereon, and the ejecting mechanism for stripping the carton therefrom.

Fig. 22 is a similar view with the parts in a different position preparatory to performing the stripping operation.

Fig. 23 is a cross-section on the line XXIII—XXIII of Fig. 22.

Fig. 24 is a fragmentary view of the hinged door for the blank holder, and the blank retaining fingers carried by said door.

Fig. 25 is a fragmentary view of the rotary wheel of the Geneva movement and its operating mechanism, the mandrels turned by the wheel, and the two clamping heads for holding the wound blanks while being acted on by the spinning mechanisms.

Fig. 26 is a vertical section on an enlarged scale on the line XXVI—XXVI of Fig. 25.

Fig. 27 is a fragmentary detailed view, in side elevation, of the mechanism for operating the strip feeding rolls to advance the paper strip step by step.

Fig. 28 is a horizontal section through the same on the line XXVIII—XXVIII of Fig. 27.

Fig. 29 is a section through one of the spinning heads and the wound blank on which it operates to fold its end in.

Fig. 30 is a diagrammatic view showing the different successive positions assumed by the mandrels when operated on by the winding, spinning, bottom-seating, and ejecting mechanisms respectively.

Fig. 31 is a view showing the carton in its different stages of formation.

Fig. 32 is a view of the two blanks employed in forming the cartons, showing at the left the first blank with a portion of its surface coated with adhesive, and at the right the second blank wholly coated with adhesive.

Fig. 33 is an end elevation of a mandrel with the first blank wound thereon.

Fig. 34 is a similar view with the second blank wound around the first; and

Fig. 35 is a sectional perspective view of the finished carton.

Figure 5:
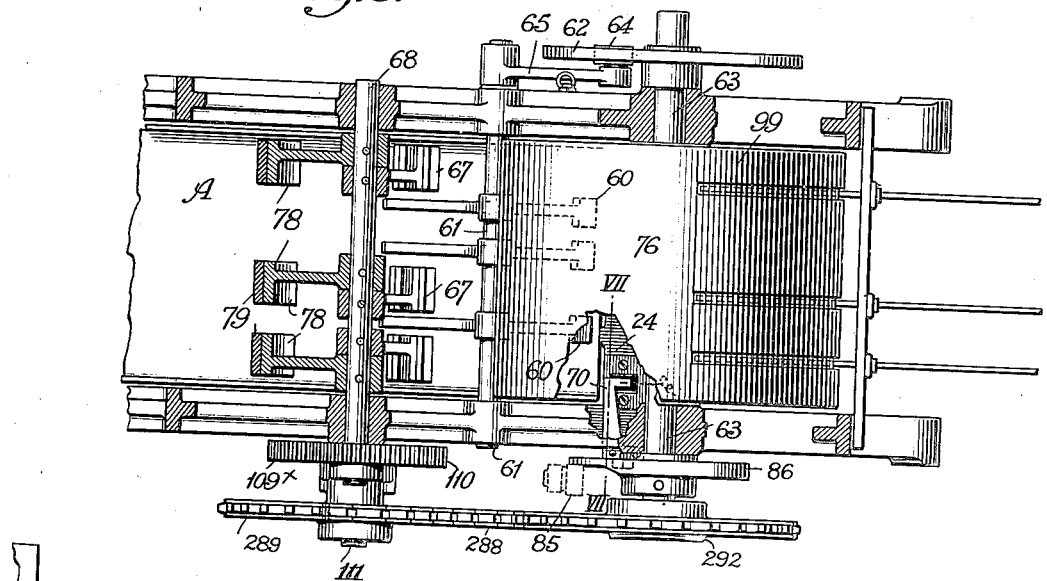
Fig. 5 is a horizontal sectional plan view on the line V—V of Fig. 2.

Referring to the drawings:

The operative parts of the machine are mounted in and sustained by a suitable frame, comprising in the present instance a base portion or bed plate 1, sustained by suitable legs 2, and front and rear open rectangular upright frame members 3 and 4 extending upwardly from the bed plate respectively at its front and rear.

The various mechanisms for operating on the blanks to form the same into cartons, as heretofore partially described, are mounted between and sustained by the two upright frame members, and the two sets of blanks are fed into the machine from its opposite ends from the blank holders 5 and 6 by their associated blank extracting and blank feeding mechanisms, the blank holder 5 being connected to and extended outward from one end of the base frame and being adapted to hold a pile of blanks A for the first winding, and the holder 6 being connected with and extending outward from the opposite end of the base plate and being adapted to hold a pile of blanks B for the second winding. The two blanks in the present instance are of the same length and are long enough to surround the mandrel in substantially two coils or convolutions, and the blanks B are slightly wider than the blanks A, in order to furnish sufficient overhang of the blanks B to provide for the seating and confining of the two bottoms of the carton.

Figure 14:
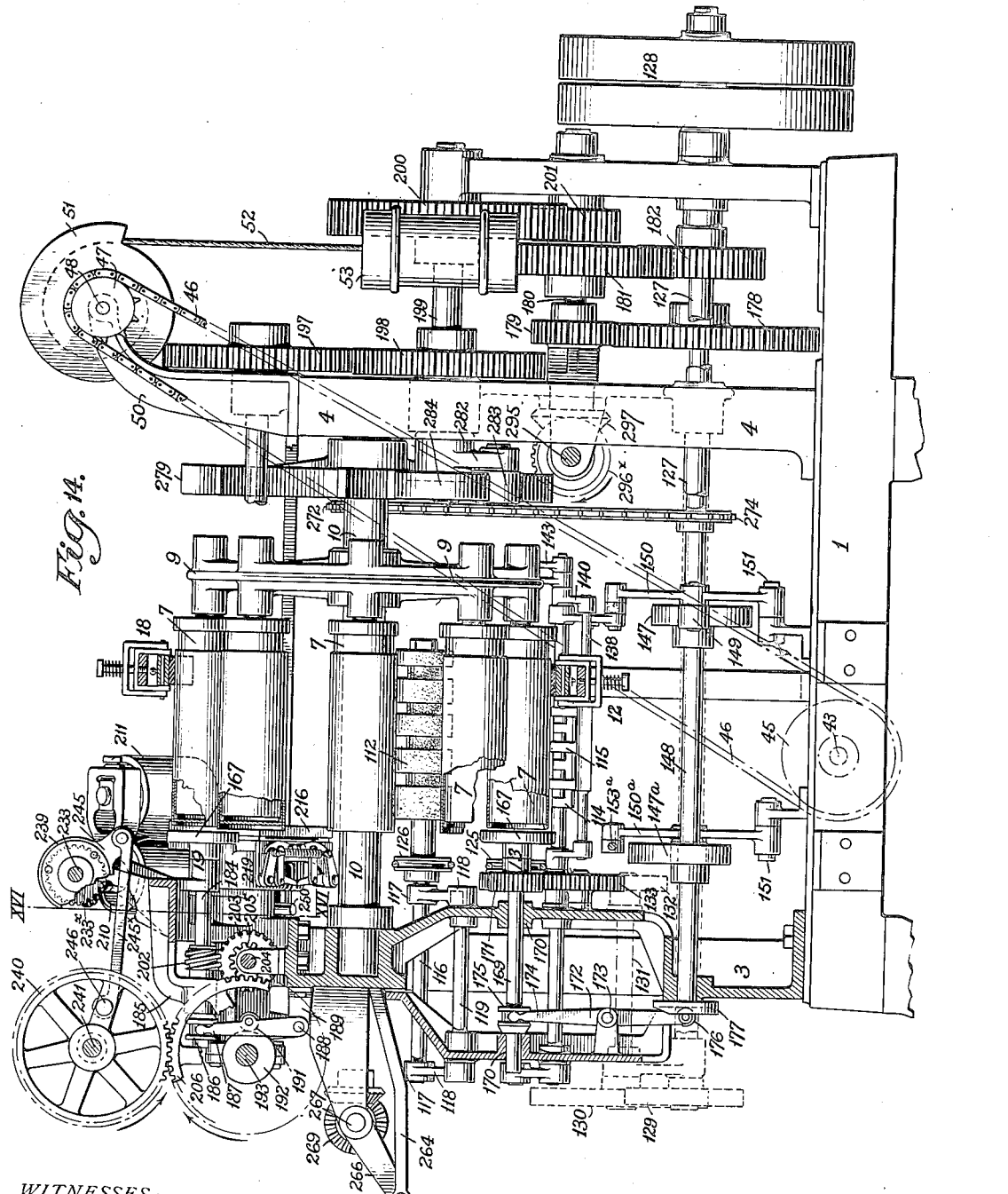
Fig. 14 is a transverse sectional elevation on the line XIV—XIV of Fig. 13, looking from the right in said figure.

The blanks from the two holders are wound upon forming mandrels 7, of which there are eight in the present machine, which are connected with the outer end of equally spaced radial arms 8 of a spider 9, and project forward horizontally therefrom, the said spider being fixed to a horizontal operating shaft 10 mounted in suitable bearings on the machine frame as shown in Fig. 14, and being turned or moved step by step with a pause between each movement, by the mechanism presently to be described. As shown at $1^x$ and $2^x$, Fig. 31, these mandrels consist each of a hollow cylindrical shell $7^a$, having heads $7^b$ fixed within the same at its opposite ends, which heads are loosely mounted on a central rod or stem $7^c$, the stems of the several mandrels being fastened fixedly at their rear ends to the arms of the spider, whereby the mandrels are free to rotate on the spider about their longitudinal axes. At its rear end the shell is surrounded by a fixed collar $7^d$ containing in its front edge a number of open notches $7^e$, between which are lugs $7^f$. The lugs serve as a gauge for the blanks and determine the position of the wound blanks on the mandrel, the rear edge of which blanks abut against the lugs, while the intervening notches enable the ejecting device, which will be fully described later on, to engage the rear end of the carton and eject the same from the mandrel.

The blanks A from the holder 5 are fed from the top of the pile in succession, and receive a coating of adhesive on a portion of their surface, as shown at $a$, Fig. 32, the first blank being presented to an empty mandrel in position $1^z$, Fig. 30. Here the blank is acted on by the first blank winding mechanism 11, Figs. 1 and 2, which operates to wind the same on the mandrel with the outer convolution cemented down on the inner convolution, and with the forward end of the wound blank projecting some distance beyond the end of the mandrel, as shown at $1^x$, Fig. 31. The mandrel-carrying spider now makes a further movement, bringing the mandrel with the first blank wound thereon to position $2^z$, Fig. 30. In this position the coiled blank is held from turning on or with the mandrel by a clamping device 12, and the projecting end of the blank is acted on by the first spinning mechanism 13 of the form shown in Fig. 29, which acts to fold or spin the projecting end of the blank inwardly on itself as shown at $2^x$, Fig. 31. The spider now makes a further movement, and the mandrel is carried to position $3^z$, Fig. 30. In this position the topmost blank B from the blank holder 6 is fed from the pile of blanks and presented to the mandrel, which blank is coated throughout its area with a suitable adhesive as shown at $b$, Fig. 32. The presented blank is acted on by the second winding mechanism 14, Fig. 1 similar to the one above mentioned, which winds the second blank around the first on the mandrel, and cements the same down thereon, with its forward end projecting beyond the folded-in end of the first blank, as shown at $3^x$, Fig. 31. The mandrel-carrying spider now makes another movement, thereby bringing the mandrel with the two blanks wound thereon to position $4^z$, Fig. 30. This is an idle position of the mandrel and no operation is performed at this point, although the blank on the following mandrels are being subjected to the respective operations above mentioned at positions $1^z$, $2^z$, and $3^z$. A further advance of the mandrel-carrying spider carries the mandrel to position $5^z$, Fig. 30, and in operative relation to the first bottom forming and seating mechanism 15, Figs. 15 to 19, which acts to punch a disk-like bottom 16 from a length of strip material 17, and seat the same within the projecting end of the outer wound blank and against the folded-in end of the inner blank, as shown at $5^x$, Fig. 31. The spider now makes another advance and carries the mandrel to position $6^z$, Fig. 30. Here the partially formed carton is held by the second clamping device 18, Figs. 1 and 25, similar in form and action to the other clamping device 12, and while held, the projecting end of the outer wound blank is acted on by the second spinning mechanism 19, Figs. 13 and 14, which acts like the first spinning mechanism and folds the end of the blank inward on itself against the seated bottom, as shown at $6^x$, Fig. 31, whereby the bottom will be prevented from displacement or escape. The spider now makes another movement and carries the mandrel to position $7^z$, Fig. 30, in operative relation to the second bottom forming and seating mechanism 20, Figs. 13 to 15, which acts like the other mechanism 15 to punch a disk-like bottom or locking disk 21 from a length of strip material $21^x$, and seats the same within the folded-in end of the outer wound blank, as shown at $7^x$, Fig. 31, this second disk acting as a locking member to prevent the end of the blank from unfolding. This completes the formation of the carton, which is shown partially in section at X, Fig. 35. It now remains to eject or strip the finished carton from the mandrel, and this is performed by the ejecting mechanism 22 at position $8^z$ Fig. 30, in operative relation to which the finished carton on the mandrel is positioned by the further movement of the mandrel carrying spider. This mechanism is shown at Figs. 12, 13, 15, 21, 22, and 23, and it acts to engage the rear end of the carton and eject or strip the same from the mandrel.

In the foregoing description the general characteristics and features of the machine are set forth and the manner of operation of the various mechanisms in forming the completed carton from the two blanks A and B. I will now describe more fully the detailed form and construction of these mechanisms and their mode of operation.

Referring first to the blank holders and their associated blank extracting and blank feeding mechanisms, these are the same, except in one minor particular, for the two blanks A and B and a detailed description of one, that for handling the blanks A will suffice for an understanding of the other, the corresponding parts of which have like reference numerals applied.

The blank holder 5 see Figs. 2, 8 and 9 is in the form of an upright box or receptacle open at its top and bottom and comprising outer and inner end walls 23 and 24 of skeleton-like formation, a permanent front side wall 25, and a movable rear side wall or door 26, which latter is connected at its lower end to a hinged rod 27 mounted at its ends in bearings in the end walls of the holder, so that the side wall can be swung down as shown by dotted lines in Fig. 9, to open the holder and permit of the introduction of the blanks, in which position it will be supported by a horizontal bar 28 fastened to the framing of the holder and projecting rearwardly therefrom as shown at Fig. 8. This hinged wall thus forms a side door for the holder and it is releasably locked in vertical closed position by means of two spring actuated locking bolts 29 mounted in the ends of the door and adapted to engage in sockets in the end walls of the holder, as shown at Fig. 24.

Figure 15:
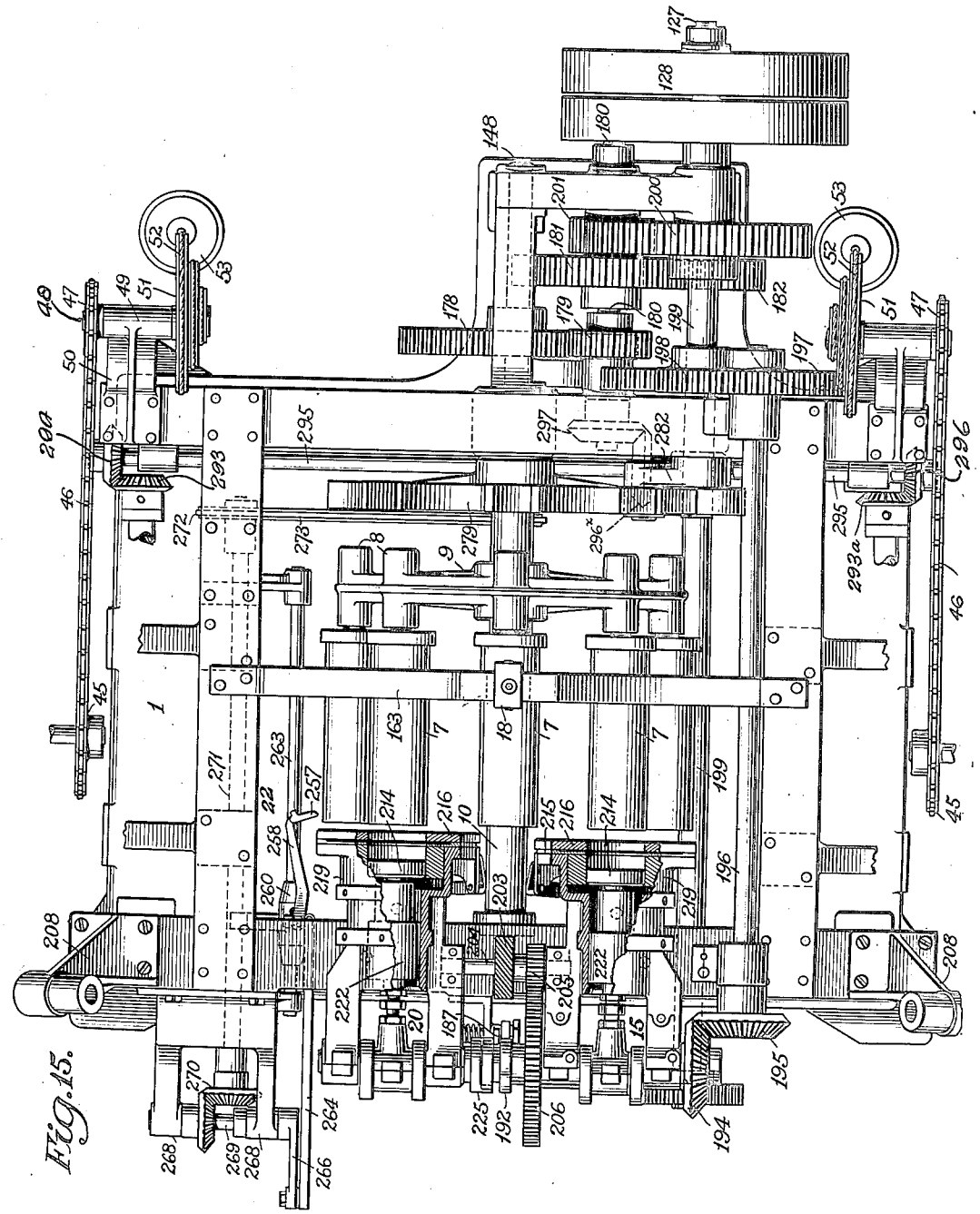
Fig. 15 is a top plan view of the parts shown in Fig. 14.

The blanks A rest on a horizontal follower or plate 30 which fits slidingly between the walls of the holder so that it may be moved up and down freely therein, and this plate has fixed to it at the side next the permanent wall, two depending arms, an inner one 31 and an outer one 32 (see Figs. 1 and 2), on which are journalled upper and lower rollers 33 and 34. The inner rollers travel in a vertical guideway 35 Fig. 12 formed in the inner wall of the holder, while the outer rollers travel in a similar guideway 36 in the outer wall of the holder. The follower is urged upwardly by means of sprocket chains 37 and 38, which are connected at one of their ends to the lower ends of the two arms 31 and 32 respectively, and pass upwardly therefrom and around sprocket wheels 41 and 42, fixed to a horizontal shaft 43, which is journalled in bearings in the inner and outer end walls of the holder near their lower ends, the free ends of the two chains hanging from the sprocket wheels and having connected with them a weighted bar 44. At its inner end the shaft 43 carries a sprocket wheel 45 around which passes an endless sprocket chain 46 which extends upwardly and passes around a sprocket wheel 47 (Figs. 14 and 15). This sprocket wheel is fixed to one end of a shaft 48 mounted in a bearing 49 on a bracket arm 50 extending upwardly from the rear frame member 4, the other end of the shaft having fixed to it a fusee wheel 51, to which is connected a cord or cable 52 having a counterweight 53, attached to it. The weight tends to unwind the wheel and turn it in a clockwise direction (Fig. 13), and this action will, through the medium of the chain 46, shaft 43, the sprocket wheels thereon, and chains 37 and 38, operate to elevate the follower plate in the holder. The fusee wheel tends to equalize the elevating force applied to the follower plate notwithstanding the decreasing weight of the pile of blanks due to the successive feed of the blanks from the top of the pile in the operation of the machine, the leverage of the cable on the wheel decreasing as the same unwinds, to correspond to the decreasing weight of the pile of blanks as the follower moves up. The purpose in providing the weighted bar 44 is to obtain sufficient counterbalance on the follower to support it when fully loaded, which action could not be secured by the weight 53 without the latter being of unduly large size.

The topmost blank in the blank holder extends normally at its outer edge beneath a blank holding device in the form of a cross-bar 54, Figs. 1, 2 and 8 fixed to the inner ends of two spring fingers 55, whose outer ends are fastened to the outer wall 23 of the holder. Two stop fingers 56 are pivoted at their outer ends as at 57 to the wall 23 of the holder, and are provided with depending stop lugs 58 which normally rest on the topmost blank near its outer edge; and inward of these lugs the fingers have extensions 59 which are spaced a slight distance above the surface of the blank. At its inner edge, the blank is acted on by a number of fingers 60 constituting a blank presser device which fingers normally press down on and hold the blank at this point, but which at the proper times are raised to release the blank. These fingers 60 are carried by a rock shaft 61, and are raised at the proper time by means of a cam wheel 62 on the end of a shaft 63, which cam acts on a roller 64 on an arm 65 fixed to the end of the rock shaft 61. The arm is acted on by a spiral spring 66 which holds the roller against the cam wheel and lifts the presser fingers when the lower part of the cam engages the roller.

Figure 6:
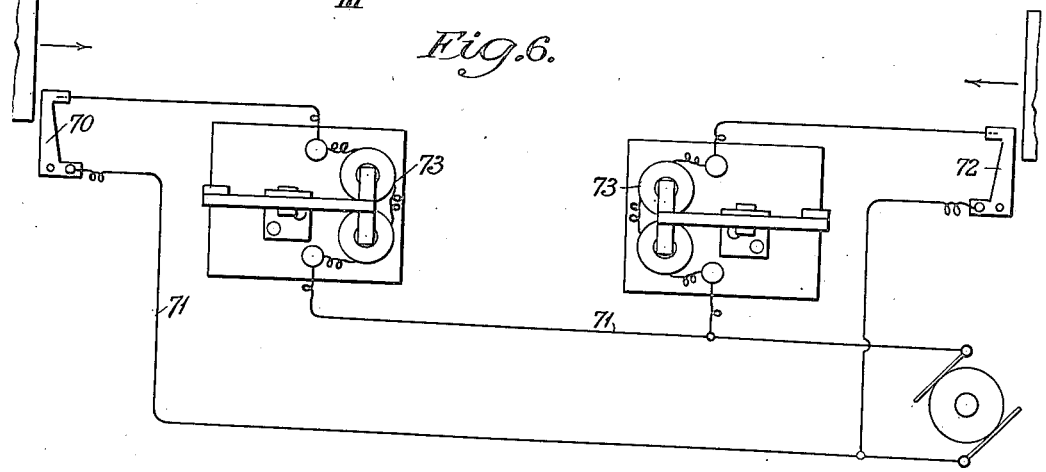
Fig. 6 is a diagram of the electric circuits controlling the action of the blank feeding mechanisms.
Figure 7:
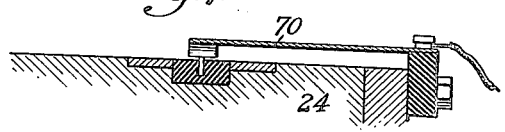
Fig. 7 is a section on an enlarged scale on the line VII—VII of Fig. 5, through the terminals of one of the circuits, controlling the action of the blank feeding mechanisms.

The blank held by the several devices described is acted on by a gang of rotary blank flexing fingers 67 constituting a blank flexing member which fingers are fixedly connected to a horizontal rotary shaft 68 mounted in suitable bearings in the framework of the blank holder and extending some distance above the open end of the holder, the said fingers having their active ends provided with gripping surfaces preferably in the form of rubber facings or pads 69 These flexing fingers, as they sweep around in their rotation, will engage the surface of the blank and will flex the same, as shown in Fig. 2, thereby withdrawing the outer edge of the blank from beneath the cross-bar 54 and the stop lugs 58 of the stop fingers 56, the opposite end of the blank being held during this action by the presser fingers 60. On the continued movement of the flexing fingers, they will disengage the blank (see Fig. 3), and the tendency of the flexed portion of the blank to straighten out, will cause its outer end to bring up against the stop lugs 58, this position of the blank being shown in Fig. 3. At the moment that the flexing fingers disengage the blank, the presser fingers 60 are lifted from engagement with the same by the action of the cam wheel 62 and spring 66, and the blank being released with its outer end abutting against the stop lugs 58, and with the flexure therein, the latter in straightening out will thrust the inner end of the blank to the right beneath a spring finger 70 constituting one terminal of a normally closed electric circuit 71, Figs. 6 and 7, the other terminal of which is constituted by a finger 72, the effect of the thrust of the blank between the two terminals being to break the normally closed circuit. This circuit through the medium of suitable electro-magnets 73 included therein, as shown in Figs. 2 and 6, controls a presser roller 74 which is journalled in the ends of two arms carried by a rock shaft 75. An arm 75$^b$ is connected to one end of the rock shaft and has fixed to it a weight 75$^c$, and a link 75$^d$ is pivoted at its upper end to the arm and is pivoted at its lower end to an armature lever 75$^e$, which in turn is pivoted to a bracket 75$^f$ sustained by the machine frame adjacent the magnet. Normally, with the circuit closed, the roller 74 is held by the magnet free from engagement with the surface of a feeding drum 76 carried by the shaft 63, but when the end of the blank is thrust forward as above described, and breaks the circuit, the weight 75$^c$ acting on the shaft 75 will rock the same and lift the roller into engagement with the drum.

The shaft 68 before alluded to as carrying the flexing fingers has fixed to it a gang of blank advancing fingers 78, which follow in the wake of the flexing fingers, and like the flexing fingers they are provided on their active ends with blank gripping facings 79. At the moment that the presser fingers 60 release the blank and the latter thrusts forward and breaks the circuit, these advancing fingers come around and engage the released blank and advance the same and enter its inner edge in the bite of the presser roller 74 and a feeding drum 76, and as the drum rotates, the blank will be fed forward between it and the roller, and passing through a horizontal guide 80, it will be presented to the forming mandrel at position 1$^z$, Figs. 1 and 30.

Figure 10:
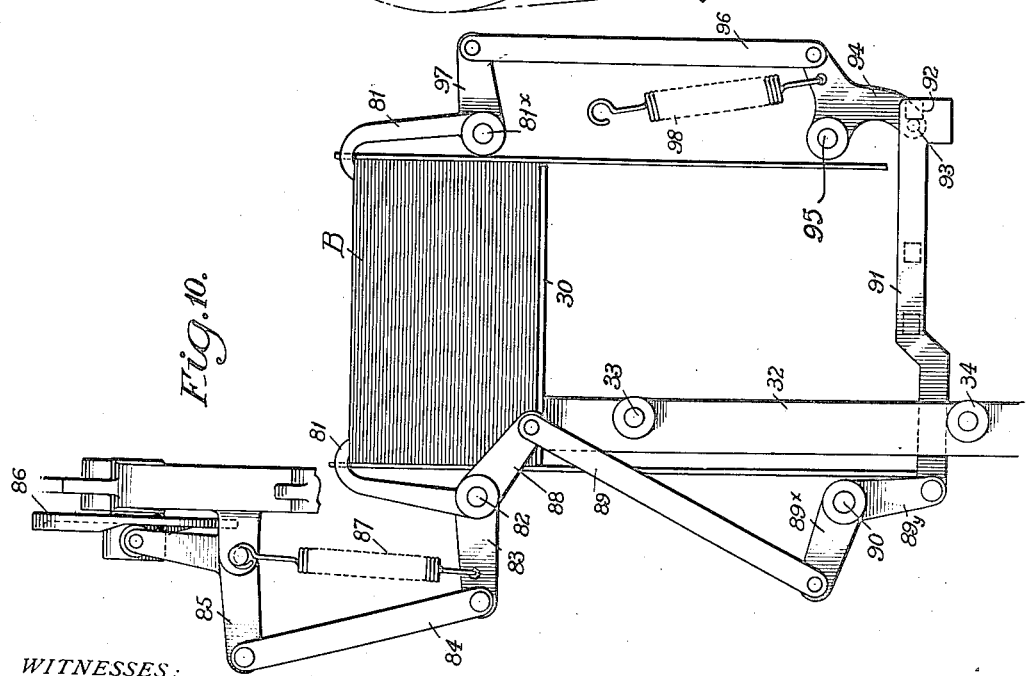
Fig. 10 is a view similar to Fig. 9, with the end framing and other parts removed, and showing the blank confining fingers and the connections for operating them.

Just previous to the moment when the blank is flexed by the flexing fingers as above described, blank retaining fingers 81, which before had been thrust inwardly from opposite sides of the holder and were engaging and holding the topmost blank down, are moved outwardly so as to release the blank and permit it to be flexed and fed forward. These fingers are shown best in Figs. 8, 9 and 10, there being two pairs arranged on opposite sides of the holder respectively, adjacent its opposite ends. After moving outwardly to permit the blank to be flexed, they immediately move back so as to engage the next blank beneath and prevent this from being displaced or fed forward with the first blank. The fingers at the rear side of the holder, Fig. 10, are mounted fixedly on a horizontal rock shaft 81$^x$, journalled in bearings carried by the holder door 26, while those at the opposite side of the holder are mounted on a horizontal rock shaft 82 journalled in bearings on the holder frame. The rock shaft 82 has fixed to it an arm 83 which is connected by means of a link 84 with a bell crank lever 85, the upper arm of the lever having a roller which is engaged by a rotary cam 86 fixed to the shaft 63 of the blank feeding drum, by which means the bell crank lever will be rocked to actuate the retaining fingers. The arm 83 is acted on by a spring 87 connected with a fixed part of the holder frame, the spring tending to pull up on the arm and thereby maintain the roller in contact with the cam and urge the retaining fingers inwardly on the blank. The rock shaft 82 is connected by intermediate connections with the opposite rock shaft 81$^x$ in order that both sets of retaining fingers on the opposite sides of the holder will be moved outwardly and inwardly in unison. These connecting parts consist of an arm 88 on the end of the rock shaft 82, to which arm is pivoted the upper end of a link 89, the lower end of which is pivoted to an arm 89$^x$ carried by a rock shaft 90 mounted on the framing of the holder. This shaft has another arm 89$^y$ which is pivoted to a horizontal rod 91 which extends therefrom beneath the holder to the opposite side of the same, at which point it is provided with a lug 92. This lug is adapted to engage a pin 93 on one arm of a bell crank 94 carried by a rock shaft 95 mounted on the hinged door of the holder. The other arm of the bell crank is pivoted to a link 96 which is in turn pivoted to an arm 97 on the rock shaft 81$^x$. The bell crank 94 is acted on by a spring 98 which tends to rock it so as to thrust the link 96 upwardly and thereby rock the shaft 81$^x$ and swing the retaining fingers inwardly. In the position of the parts shown in Fig. 10, the roller on the bell crank lever 85 is engaging the low surface of the cam 86, and the lug 92 on rod 91 is engaging pin 93 on the bell crank 94, and the springs 87 and 98 are holding the parts with the retaining fingers extending inwardly and engaging the topmost blank. When now the cam 86 is rotated and the high part engages with the roller, the rock shaft 82 will be rocked, and rod 91 will be pulled to the left, this action, due to the engagement of lug 92 with pin 93, rocking bell crank 94 and correspondingly rocking rock shaft $81^x$, the rocking motions of the shafts $81^x$ and 82 being in a direction to swing the retaining fingers outwardly free of the blank. The parts are so timed that the cam will engage the roller and thus swing the retaining fingers outwardly at the moment that the flexing fingers engage the blank and flex it, and the retaining fingers immediately swing back under the influence of the springs 87 and 98, just as soon as the flexed portion of the blank rises free of the path of the fingers, the result being that the second blank will be retained from displacement when the first blank is advanced from the holder. The reason for having the rod 91 disconnected from the bell crank lever 94 as distinguished from pivoting the same thereto, is because of the fact that the shaft $81^x$ and bell crank 94 are mounted on the hinged door of the holder. This door can be swung outwardly to open position, as shown by dotted lines in Fig. 9, in order to permit the blanks to be placed in the holder, and by having the rod 91 and bell crank disconnected, this swinging motion of the door is permitted, the pin 93 on bell crank 94 in this swinging movement shifting to the left free of the lug 92 on rod 91.

As the blank is fed forwardly by the feeding drum 76 and cooperating presser roller 74 a suitable adhesive is applied to the second half of the blank as shown at $a$ in Fig. 32, by means of a raised segmental adhesive applying surface 99 on the drum which extends beyond the periphery of the drum and circumferentially thereof for a distance only sufficient to apply the adhesive to the last half of the blank. The adhesive is applied to the surface 99 by a roller 100 which engages a second roller 101 immersed in a pan $102^x$ of adhesive. The roller 100 is supported a slight distance from the main lower surface of the drum, so that when the raised adhesive applying surface passes it, the latter will engage said surface and transfer the adhesive to the same, and by means of this surface the adhesive will be applied to the blank. The parts are so timed in their movements that during the first portion of the feed of the blank between the feeding drum and presser roller, the low surface of the drum will contact with the blank, but during the remaining portion of the feed of the blank, the raised adhesive applying surface will engage the blank and will apply the adhesive to the last half only of the same.

Figure 11:
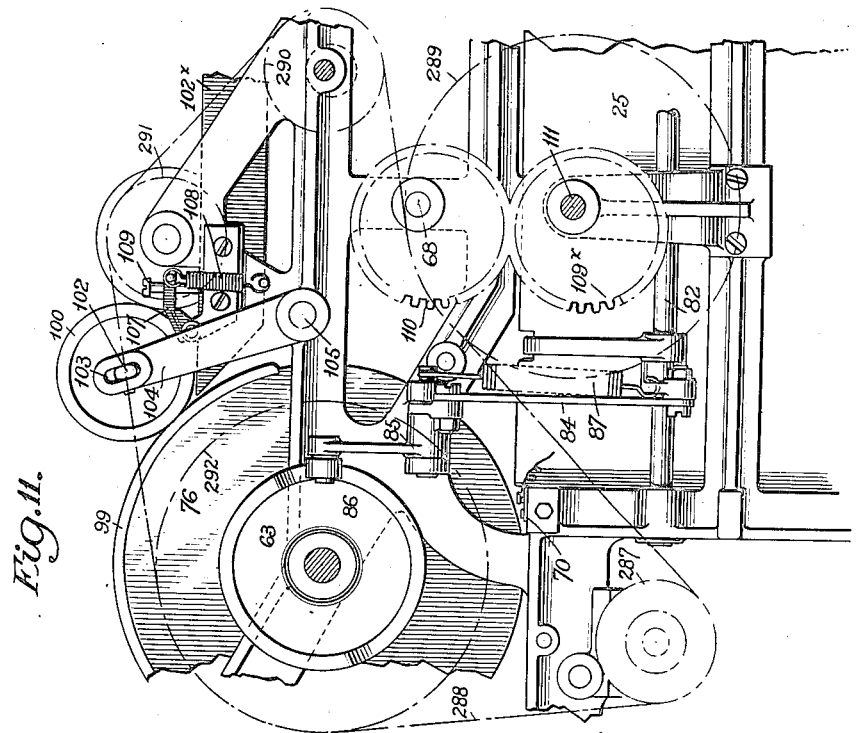
Fig. 11 is a view of the parts shown in Fig. 9, looking from the right of Fig. 9.

The roller 100 is rotatably mounted on a shaft 102 provided on its ends with flattened studs which extend loosely in radial slots 103 in the outer ends of arms 104, whose inner ends are fixed to a rod 105 carried by the holder frame. The roller 101 is provided with a doctor knife 106 (see Figs. 2 and 11), which is mounted in a frame 107 pivoted to brackets fixed to the sides of the adhesive pan so that the knife may be adjusted to and from the periphery of the roller. This adjustment is effected by means of an adjusting screw 109 screwed through the frame 107 and bearing at its end against one of the bracket plates, a spring 108 being connected respectively with the frame 107 and machine frame, and tending to pull the frame downwardly on its axis and cause the edge of the doctor knife to approach the surface of the roller. By turning the adjusting screw, the knife frame may be swung upwardly on its axis which will carry the doctor knife further away from the surface of the roller.

The shaft 68 carrying the flexing fingers and the advancing fingers before alluded to, is driven in such manner that the flexing fingers will approach and engage the blank with a comparatively slow motion to flex the same, and the advancing fingers will be accelerated in their motion and will engage and advance the blank with a comparatively rapid motion. In the present instance, this is effected by the two eccentrically mounted spur pinions $109^x$ and 110, the pinion $109^x$ being a driving pinion and mounted on a rotary shaft 111 and the pinion 110 being a driven pinion and mounted on the shaft 68. These pinions are so mounted on their respective shafts relatively to each other that as the flexing fingers sweep down to engage the blank to flex it, the short radius of the pinion $109^x$ will be in line with the long radius of the other pinion. Consequently this latter pinion will be driven at slow speed. But when the advancing fingers sweep down to engage the blank and feed it as shown in Fig. 4, the long radius of the driving pinion will be in line with the short radius of the driven pinion and the latter will be driven at higher speed.

In the mechanisms operating on the blanks as above described, the several members which act on the topmost blanks in succession to temporarily hold them in place, together with the blank flexing fingers 67 and the blank advancing fingers 78 and their associated operating parts, constitute a blank extracting mechanism; and the feeding drum 76 and its cooperating presser roller 74 and their associated operating parts constitute a blank feeding mechanism; the function of the extracting mechanism being to separate the topmost blanks in succession from the pile and advance the same to the action of the feeding mechanism, and the function of the latter being to feed the advanced blanks to the action of the blank winding mechanism.

While the blank is being drawn by the feeding mechanism between the terminal fingers of the electric circuit, the circuit as before stated will be open and the presser roller 74 will press the blank against the feeding drum and adhesive applying surface; but when the rear end of the blank passes from between the terminals, the latter coming together and contacting with each other will close the circuit and the magnet will move the roller away from the drum. The parts are so arranged relatively and timed in their actions that the circuit will be thus broken and the roller moved away from the drum just before the rear end of the adhesive applying surface reaches the rear end of the blank. Consequently there will be no liability of the adhesive being squeezed out between the end of the surface and blank and being transferred to the presser roller and surface of the drum. The effect therefore of the electrically operated means controlling the presser roller is to cause the presser roller to move up to the drum in operative relation to the same as the front end of the blank approaches the bite of the roller and drum, and to cause the roller to move away from the drum just before the rear end of the blank reaches the bite of the roller and drum, the blank in its forward movement effecting these operations automatically through the medium of a circuit controller constituted by the terminal fingers of the electric circuit.

The blank fed by the feeding drum through the guideway 80 will have its end presented as before stated to the first mandrel at position 1ˣ, Fig. 30, where it will be wound on the mandrel by the first winding mechanism 11 before alluded to, the first portion of the blank, that free of adhesive, making the first convolution in contact with the surface of the mandrel, and the second portion of the blank, that with the adhesive coating applied making the second convolution in contact with the first and adhering firmly to the same.

In this connection it is to be noted that the relation of the blank feeding mechanism to the blank winding mechanism and the length of the individual blanks is such that the blank will be acted on and positively advanced by the winding mechanism before it is disengaged by the feeding mechanism, and before the rear end of the blank passes from between the terminals of the electric circuit. As a result there will be no interruption in the advance of the blank when, on the closure of the circuit, the presser roller 74 is moved away from the feeding drum 76.

This winding mechanism 11 is the same in form, construction and operation as the winding mechanism 14 which applies the second blank B, and therefore I will describe in detail only the mechanism 11, and will designate the corresponding parts of the mechanism 14 by the same reference numerals.

The winding mechanism comprises oppositely positioned rotary rolls an upper wiping roll 112 and a lower winding roll 113, which are spaced apart from each other a sufficient distance to permit the mandrels in their step by step movements to be positioned successively between them in operative relations to the same, and opposing gangs of semi-circular blank guiding fingers 114 and 115 which are adapted to be closed on the positioned mandrel to embrace the opposite sides of the same in the spaces between the rolls, to guide the blank around the mandrel, as shown at Fig. 1, and which after performing their function are separated from the mandrel and out of the path of the same, as shown in Fig. 2, to permit the mandrel to be moved to its next position. The rolls are preferably provided with a yielding or rubber-like surface to better feed the blanks, and they are divided into a number of spaced sections, as best shown in Fig. 14. The upper roll 112 is carried by a horizontal spindle 116 which extends forwardly beyond the ends of the mandrels and is journalled in bearings 117 in two arms 118, extending upwardly from a sustaining bar 119 fixed in the frame of the machine. The lower roll 113 is similarly carried by a spindle 120, mounted for rotation in two arms 121 carried by a bar 122 fixed in the machine frame, the two rolls being thus positioned opposite each other so as to act on the blank at opposite sides of the positioned mandrel. The lower roll is rotated in the direction of the arrow in Fig. 30, so that the blank presented in the bite between it and the mandrel will be fed forward and wound on the mandrel, and the upper roll is driven at a relatively higher speed in the direction of the arrow, so that it will have a wiping action on the blank and smooth the coils down with a rubbing action and cause them to adhere to each other.

To rotate the rolls in the direction indicated and at the relative speeds mentioned, I prefer to employ as shown in Fig. 30 two crossed driving bands 123 and 124, the band 123 passing around a pulley 125 on the spindle of roll 113 and around a pulley 126 of smaller diameter on the spindle of roll 112 of the other coiling mechanism 14, and the band 124 passing around a pulley 125 on the spindle of roll 113 of the winding mechanism 14 and around a pulley 126 of smaller diameter on the spindle of roll 112. By this means, an upper wiper roll of one winding mechanism is rotated by the lower winding roll of the other winding mechanism and at relatively higher speed.

Motion is imparted to the rolls 113 from a main horizontal transverse driving shaft 127, Fig. 13, which is mounted in suitable bearings in the machine frame and is provided on its rear end with a driving pulley 128, which may be driven from any suitable source of power. At its front end the shaft has fixed to it a pinion 129 which meshes with a larger pinion 130 on a horizontal short shaft 131 mounted in the machine frame at its front and extending parallel with the driving shaft. At its inner end the shaft 131 carries a pinion 132 which engages a pinion 133 at the left and another pinion 134 at the right, said pinions 133 and 134 being carried by studs journalled in suitable bearings in the machine frame. Pinion 133 meshes with an idler pinion $133^x$ and which in turn meshes with a pinion 135 on the spindle of winding roll 113; and pinion 134 meshes with a pinion 136 on the spindle of winding roll 113, whereby said winding rolls of the two mechanisms are driven, and through the medium of the cross belts 123 and 124 before described, the two wiper rolls are driven at relatively higher speeds.

The opposing gangs of blank guiding fingers 114 and 115 before alluded to, are fixed to cross bars 137 and 138 respectively, the cross-bar 137 being fixed at its ends between arms 139, and the cross-bar 138 being mounted at its ends between arms 140. The arms 139 extend downwardly and are fastened to the ends of a sleeve 141 loosely mounted on a rock shaft 142 mounted in bearings in hanger arms 143 fixed to the machine frame, whereby the arms 139 may pivot about the shaft 142, and the blank guiding fingers 114 be caused to move to and from the positioned mandrel. The arms 140 carrying the guiding fingers 115 are fixed to the rock shaft 142, and one of the arms has fixed to it a depending extension 144, to the lower end of which a horizontal link 145 is pivoted, whence the link extends to the left, Fig. 2, and is pivoted to a pendent link 146, which is pivoted at its upper end to the machine frame, and which is connected to one of the arms 139 by means of a connecting link $146^x$ pivoted to the link and arms respectively. As a result of this construction and arrangement of the parts, when arms 139 are rocked on their pivotal axes on the shaft to the right, Fig. 2, the blank guiding fingers 114 will approach the mandrel, and this action, due to the connection of these arms with the arms 140, will cause the other gang of guiding fingers 115 to simultaneously approach the mandrel, the two gangs of fingers finally coming to rest in position to surround the same, as shown in Fig. 1. A reverse motion of the arms 139 will cause a reverse operation of the parts, and the two gangs of guiding fingers will be moved away from the mandrel.

The arms 139 are actuated in timed relation to the feed of the blank to the mandrel, so that the guide fingers will be moved inwardly in operative relation to the mandrel just before the end of the blank is presented thereto. This is effected by means of a cam 147 fixed to an operating shaft 148 mounted in suitable bearings in the machine frame, the said cam engaging a roller 149 on an upright vibrating lever 150 pivoted at its lower end, as at 151, to the machine frame. The upper end of the lever is connected with the lower end of a downward extension 152 of one of the arms 139, by means of a horizontal link 153. In the rotation of shaft 148, the cam by engaging the roller will vibrate lever 150, back and forth and thereby correspondingly swing links 139 and cause the operation of the guiding fingers, as above described. Shaft 148 extends transversely across the machine and has at its opposite end a similar cam $147^a$ fixed to it, which engages a lever $150^a$ similar to lever 150. The lever $150^a$ is connected by means of a link $153^a$ to an extension 152 of one of the arms 139 which operate the guiding fingers of the winding mechanism 14 for the second blanks B. The extension 152 of arm 139 has connected with it a spring 154 which is also connected to the machine frame, the tendency of the spring being to pull on the extension in opposition to the pull exerted by the cam, thereby maintaining the roller in contact with the cam and acting to shift arms 139 and close the fingers on the mandrel when the lower part of the cam engages the roller. The two cams 147 and $147^a$ operate to cause the two sets of guide fingers of the two winding mechanisms to operate in unison, the opposing gangs of the two sets opening at the same time that the mandrel carrying spider is rotated to advance the mandrels, and closing after the spider comes to rest with the mandrels in their new positions.

As a result of this construction and operation of the parts of the winding mechanism described, the blank presented to the mandrel at position $1^z$, will be wound about the same in the form of a hollow cylinder, with the coils connected together and with the end of the wound blank projecting a short distance beyond the front end of the mandrel as shown at $1^x$, Fig. 31. When this action is completed, the continued operation of the machine causes the guide fingers to move away from the mandrel to the position shown in Fig. 2, and the mandrel carrying spider makes a partial turn, thereby carrying the mandrel with the first blank thereon from between the winding and wiper rolls, and moving it to position $2^x$, Fig. 30, where it comes to rest in proper operative relation to the clamping device 12 and spinning mechanism 13 before alluded to.

The wound blank when it reaches this position is, it will be remembered, in the form shown at $1^x$, Fig. 31, its forward end projecting a slight distance from the end of the mandrel. The clamping device 12 is similar in construction and operation to the second clamping device 18 and it will suffice therefore to describe the device 12 in detail for an understanding of the other one, the parts of which will have the same reference numerals as are applied to device 12. The clamping device 12, in the present instance is in the form of a block or head 154, having an open socket $154^x$ curved to conform to the curvature of the wound blank on the mandrel, as best shown in Figs. 14, 25 and 26. This block is pivoted on a horizontal pivot bolt 155 extending parallel with the axis of the mandrel, to the upper end of a U-shaped frame 156, which frame embraces a similarly shaped frame 157 provided with vertical aligned slots through which the pivoting bolt 155 extends, whereby the frame 156 may slide up and down to a limited extent on the frame 157. The U-shaped frame 156 is urged upwardly, with the pivoting bolt engaging the upper walls of the slots, by means of a tension spring 160 encircling a rod 161 fixed to and extending downwardly from the frame 157 through an opening in the frame 156, the upper end of the spring bearing against the under side of the frame 156 and the lower end of the spring bearing against a head 162 on the lower end of the rod. The frame 157 is fixed to the upper end of a standard 163 which is fixed at its lower end to the machine frame and is in such position relative to the axis of the mandrel carrying spider that the axis of the clamping block will be in vertical alignment with the axis of the spider and disposed centrally beneath the mandrel, when the latter is advanced to the position where the end of the wound blank is to receive the spinning or folding operation. A pull spring 164 is connected at one end to the clamping head and at its other end to the standard 163, and the tendency of the spring is to yieldingly hold the head tipped to the left as shown by dotted lines in Fig. 25, in which position, its open socket is presented to the left to receive the mandrel as the latter advances to position the blank for the spinning operation. As the mandrel engages the tipped clamping head and enters the open socket therein, the continued movement of the mandrel in taking its final position, will rock the head on its axis to the right, in which action the U-shaped frame 156 will be depressed and will compress spring 160 so that, when the mandrel reaches its final set position as shown in Fig. 1, the clamping head will be in its central position and exerting an upward pressure against the wound blank on the mandrel under the influence of the spring, thereby holding the blank and mandrel firmly and fixed. The socket in the head is preferably furnished with a rubber surfacing 165 adapted to take a firm grip on the blank and fixedly hold the same against rotation on the mandrel and hold the mandrel from turning. The rocking motion of the pivoted clamping head to the left to its receiving position under the action of the pull spring, is limited and determined by a stop pin 166, which extends upwardly from the top of the standard in position to be engaged by the side of the head when the latter is pulled to the left by the spring.

As shown in Fig. 14, the two clamping heads are disposed in a plane intersecting the mandrels near their inner ends and adjacent the mandrel carrying spider, so that they will engage the wound blanks and the mandrel adjacent their inner ends and distant from their outer projecting ends which are acted on by the spinning mechanism.

While the blank on the mandrel is held by the clamping head as shown in Fig. 1, it is acted on as before mentioned by the spinning mechanism 13, which comprises a rotary spinning head 167 of the form shown in detail in Fig. 29 and also in Figs. 13 and 14, containing in its flat active face a circular groove 168, which, as the head is moved up to the projecting end of the wound blank, will receive the end of the blank, and by the rotative movement of the head and its simultaneous advance, the edge of the blank will be caused to fold in on itself and thereby form the fold shown at $2^x$, Fig. 31. This head is fixed to the inner end of a horizontal shaft 169 which is mounted to rotate and slide endwise to a limited extent in bearings 170 on the machine frame at the front, whereby the head is adapted to be rotated in contact with the projecting end of the blank, and at the same time is adapted to be forced longitudinally of the blank so as to spin and fold in the end of the same. Rotary motion is imparted to the head by means of a pinion 171 fixed to the shaft and driven by the pinion 133 before alluded to (see Fig. 13), the teeth of the pinion 171 being of such length as to maintain a driving engagement with the other pinion notwithstanding the different positions of the shaft in an endwise direction. The endwise movements are imparted to the head by means of a rocking lever 172, (Fig 14) which is pivoted between its ends as at 173 to the machine frame and is provided at its upper end with a fork 174 engaged loosely in a peripheral groove in a collar 175 splined to the shaft 169. At its lower end the lever carries a roller 176 which is engaged by a face cam 177 mounted on the outer end of the shaft 148 before alluded to as carrying the cams for operating the two sets of blank guiding fingers. The shaft 148 is provided near its rear end with a pinion 178 which is engaged by a smaller pinion 179 on a shaft 180 which carries a pinion 181 driven by a pinion 182 on the main driving shaft 127 before alluded to.

The rocking lever 172 operated by the cam 177 is acted on by a torsional spring 183 (Fig. 13), which is coiled about the pivotal axis of the lever, and has one end fixed to the machine frame and its other end fixed to the lever, the tendency of the spring being to rock the upper end of the lever inwardly and maintain contact of the roller with the cam.

The other spinning mechanism 19, which it will be remembered is situated at position $6^z$, Fig. 30, to act in connection with clamping device 18 on the carton in a further stage of its formation, is generally similar in form and operation to that just described. As shown best in Figs. 13 and 14, the head 167 of this mechanism is fixed to the inner end of a shaft 184, mounted for rotation and endwise movements in depending bracket arms 185 carried by the machine frame. At its outer end the shaft has fixed to it a grooved collar 186 which is engaged by a fork on the upper end of a vibrating lever 187 fixed at its lower end to a rock shaft 188 mounted in suitable bearings 189 on the machine frame. The shaft is surrounded by a torsion spring 190, one end of which is fixed to the lever and the other end of which is fixed to the frame, the effect of the spring being to swing the lever outwardly and maintain engagement of a roller 191 thereon with an operating cam 192 fixed to a horizontal crank shaft 193 mounted in suitable bearings on the machine frame. This shaft has fixed to one end a beveled gear 194 which is engaged by a bevel pinion 195 on a shaft 196 mounted in bearings on the machine frame and having fixed to its opposite end a pinion 197 which is engaged by a pinion 198 on a shaft 199, which shaft carries a pinion 200 driven by a pinion 201 on the shaft 180 before alluded to, the latter shaft receiving its motion from the main driving shaft by means of pinions 181 and 182. By these connections, the shaft carrying the spinning head is given a back and forth reciprocation. The shaft 184 is rotated by means of a worm 202 which is splined to the shaft and is driven by a worm wheel 203 on a shaft 204 mounted in bearings on the machine frame and having fixed to one end of it a pinion 205. This pinion is driven by a larger pinion 206 (see Figs. 14 and 15), which is fast to shaft 193 before alluded to.

By providing means such as the clamping head described for acting on and holding the blank on the mandrel while the blank is subjected to the action of the spinning mechanism, it will not be necessary as heretofore to employ expanding mandrels, the expansion of which within the surrounding blank was depended upon to hold the blank fixedly when being operated on by the spinning mechanism. In the present machine the mandrels are of the non-expansible type and therefore simple in form and construction and inexpensive to produce, and their use possesses great advantages as compared with the more complicated and expensive expanding mandrels, and are capable of more effective and reliable action than the mandrels of the expanding type.

After the spinning mechanism 13 has acted on the wound blank the latter will appear as at $2^x$, Fig. 31. In the next movement of the mandrel carrying spider the mandrel will be advanced to position $3^z$, Fig. 30, and thereby brought into operative relation to the winding roll and wiper roll of the second blank winding mechanism 14. In this position the second blank B is applied and wound around the first, which second blank is fed from the blank holder 6 by the blank extracting mechanism and the blank feeding mechanism associated with the holder, the feeding drum 76 of the feeding mechanism being provided with a segmental adhesive applying surface 99 of a length to apply the adhesive material to the entire surface of the blank B. When the blank B therefore is wound around the previously coiled blank A by the winding mechanism 14 it will be caused to adhere firmly thereto and its end will project beyond the folded in end of blank A, as shown at $3^x$, Fig. 31.

When the second blank has been thus wound around the first, the mandrel carrying spider makes another movement, thereby bringing the mandrel to position $4^z$, Fig. 30. This is an idle position and no operation is performed on the partially formed carton at this point, the mandrel carrying spider remaining at rest while operations are being performed on the blanks on the following mandrels. The mandrel carrying spider now makes another advance and the mandrel takes position $5^z$, Fig. 30 in operative relation to the bottom forming and seating mechanism 15. This mechanism 15 is similar in form, construction and operation to the second bottom forming and seating mechanism 20 before alluded to as operating at position $7^z$, Fig. 30, to form and seat the second bottom or locking disk 21, and the two are operated simultaneously with each other on two different mandrels occupying positions $5^z$ and $7^z$, respectively.

I will therefore describe but the one mechanism 15 in detail, and will apply the same reference numerals as applied to the corresponding parts of other mechanism 20.

The strip material 17 out of which the bottoms are punched is sustained in the form of a roll in a casing 207 mounted in an inclined position on the upper end of a standard 208 extending upwardly from the machine frame at the front, there of course being two casings for the two rolls. The casings are provided with openings 209 through which the strips pass. The strip issuing through the opening in the casing passes between front and rear feed rollers 210 and 211 Fig. 20 which are geared together so that they will revolve in opposite directions and feed the strip between them as shown in Fig. 20. These rolls are mounted in suitable bearings 212 sustained in bracket arms 213 fixed to and projecting upwardly from the machine frame, and the two sets of rollers for the two mechanisms are so located that the two strips will be fed inwardly and downwardly towards each other and flatly across the open ends of the wound blanks on the two mandrels occupying respectively the positions $5^z$ and $7^z$ (Fig. 30), so that the two punches 214, in the form of circular cutting discs may advance and punch out the circular bottoms and seat them in the ends of the wound blanks on the mandrels.

From the feed rolls the strip material passes between two plates 215 and 216 sustained by the machine frame in line with the end of the mandrel occupying position $5^z$, the said plates being spaced apart a sufficient distance to permit the strip to pass snugly between them and the plates are formed with aligned circular openings 217 and 218 of a diameter corresponding to that of the bottom to be punched, which openings register with the open end of the wound blank on the mandrel. The inner plate 216 with the circular opening therein forms in effect a cutting die with which the plunger punch 214 cooperates. This punch is mounted to reciprocate in a cylindrical bore in a casing 219 projecting outwardly from the plate 215 and suitably sustained in a fixed position in the machine frame, as shown more particularly in Fig. 17. The punch is guided in its movements in a circular guiding opening 220 in a plate or block 221 in the casing 219 at the back of plate 215, and the punch is attached to the inner end of a plunger piston 222 reciprocating in the casing 219. The piston has pivoted to it, the inner end of a pitman rod 223, whose outer end is journalled on a crank 224 on the crank shaft 193, before alluded to as imparting endwise motion to the upper spinning head. This crank shaft is in the form of two aligned sections coupled together as at 225 in such manner that the sections may be disconnected from each other in an endwise direction when it is desired to remove or detach one of the punching mechanisms without detaching the other, it being understood that the crank for operating one of the punches is on one of the sections of the shaft and that for operating the other punch on the other section. The driving connection between the plunger and the plunger punch is a yielding one, so that in the event of any obstruction or resistance being offered to the advance of the punch, it will yield in relation to the plunger and thereby prevent breakage of or injury to the parts. I prefer to effect this result by the construction shown in Figs. 17 and 18, where it will be seen that the plunger punch is provided at its rear side with a stem 226 having a central extension 227. The stem slides in a bore 228 formed in the plunger, which bore is contracted at its rear end and forms a bottom or annular shoulder which loosely receives the extension 227. The stem is provided with a longitudinal slot 229 which extends through it from side to side, and a pin 230 carried by the plunger near its forward end extends in said slot, whereby a limited movement of the punch relative to the plunger axially of the latter is permitted. A spiral spring 231 surrounds the extension within the bore and bears at one end against the rear end of the stem and at its other end against the bottom of the bore. The spring normally holds the punch in a forward position relative to the plunger with the rear wall of the slot 229 bearing against the pin 230, and the spring is of sufficient strength to hold the punch to its work and cause it to cut through the strip when the plunger advances, whereby the punch is spring sustained. In the event however of resistance or obstruction being offered to the advance of the punch, the spring will be compressed on the continued movement of the plunger and the latter will be permitted to complete its throw without injury or breakage of the parts.

Figure 17:
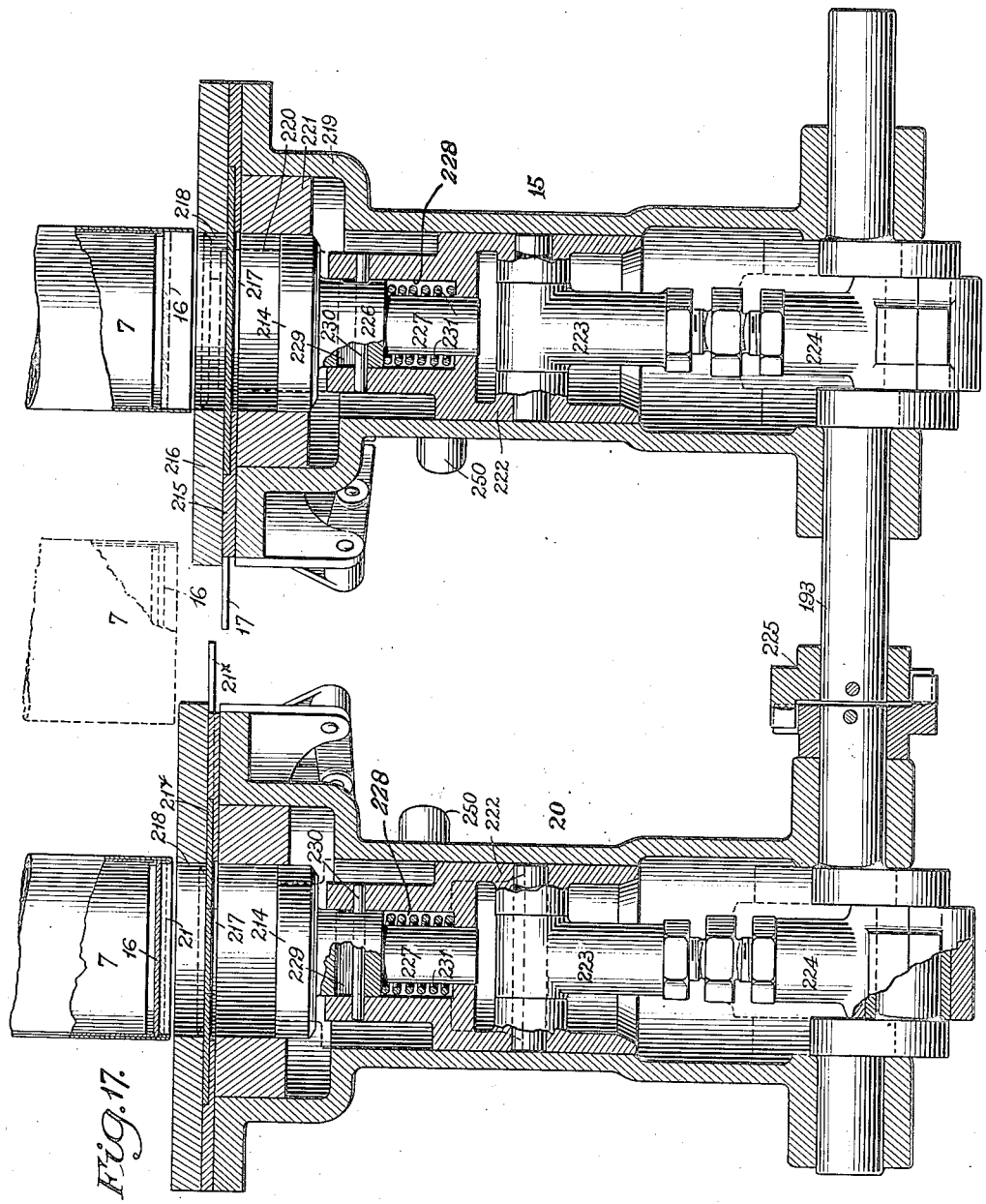
Fig. 17 is a horizontal section through the same on the line XVII—XVII of Fig. 16.

Fig. 17, at the right shows the punch in position to cooperate with the blank on the mandrel when the latter is in position $5^z$, Fig. 30. It will be remembered that at this position the mandrel will have on it the two wound blanks, the inner one having its end inturned, and the outer one projecting beyond the inturned end of the inner one. When now the plunger punch advances, its first action will be to punch out a circular disk or bottom from the strip material and as the punch continues its advance, its second action will be to push the bottom before it, and seat the same against the inturned end of the inner wound blank as at $5^x$, Fig. 31.

The two sets of feed rolls of the punching mechanisms are operated simultaneously but intermittently, so as to feed the two strips step by step. This is effected by the operating gear shown in Figs. 13, 14, 16, and 27, where it will be seen that there is mounted on the frame of the machine in suitable bearings 232 a horizontal shaft 233 which has fixed to its ends beveled pinions 233ˣ and 234, the pinion 233ˣ meshing with a bevel gear 235 fixed to the outer feed roll of the punching mechanism which operates at position 7ᶻ, and the pinion 234 meshing with a gear 236 fixed to the outer feed roll of the punching mechanism operating at position 5ᶻ, the two feed rolls of the two mechanisms being geared together by the intermeshing spur pinions 237 of one set and 238 of the other set. An intermittent motion is imparted to the shaft 233, so as to advance the strips step by step by means of a ratchet mechanism 239 (Figs. 16 and 27) which is applied to the shaft 233 and which is operated by a spur pinion 240 fixed on a shaft 241 and driven by the pinion 206 before alluded to as being driven from the punch operating shaft 193. This ratchet mechanism comprises a cam disk 242 fixed to shaft 233 and a surrounding casing 243 between which and the cams are a series of locking balls 244, so that by the oscillatory motion of the surrounding casing, the cam disk and consequently the shaft 233 will have imparted to it an intermittent advance or rotary movement. The surrounding casing is oscillated by means of an arm 245 fixed thereto, to which is pivoted one end of a pitman or link 245ˣ, the opposite end of which is pivoted to a crank pin 246 on the spur pinion 240. By the rotation of the spur pinion 240, the pitman will be reciprocated endwise and an oscillating motion will be imparted to the casing, and the shaft 233 caused to rotate step by step.

The parts of the mechanism for driving the feed rolls and punches are so timed and co-ordinated in their movements, that the punches will advance to punch out and set the bottoms in the wound blanks on the mandrels at the periods of rest between the intermittent advance movements of the strip material, it being remembered that the same crank shaft 193 by which the punches are operated, acts to drive the feed rolls (which feed the strip material) through the medium of the spur gears 206 and 240 and the ratchet mechanism 239.

Figure 18:
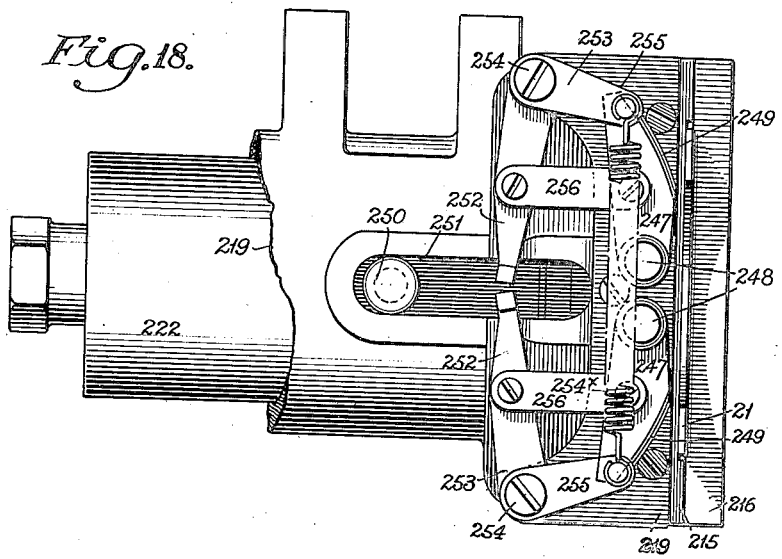
Fig. 18 is a side elevation of one of the cutting mechanisms for severing the waste material, with the parts in their normal position and as viewed in the direction of the arrow in Fig. 16.
Figure 19:
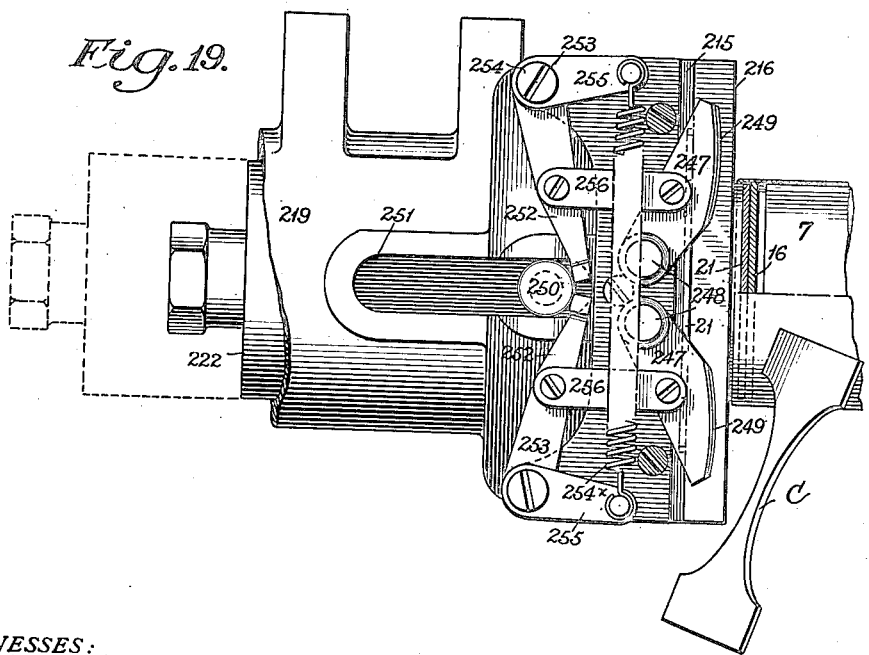
Fig. 19 is a similar view showing how the parts are actuated by the plunger punch.

In the successive actions of the punches on the strip material, a series of holes are formed therein, and in order to sever the strips so that the waste material will be separated and not carried along with the advancing strips, I provide the severing mechanisms shown more particularly in Figs. 16, 18 and 19, which are operated on the advance of the punches in punching out one set of bottoms, to sever the strips through the holes made by the punches in punching out the immediately preceding bottoms. These severing mechanisms for the two punching mechanisms are similar in form, construction and operation and each comprises two blades 247, shown in Figs. 18 and 19 which are pivoted at their inner ends as at 248 to the side of the casing 219 before alluded to, the said blades being formed with curved knife edges 249, which as the blades are swung towards each other on their pivotal axes, will cut through the portions of the strip at the two sides of the previously formed hole, thereby severing from the strip a waste piece C of the form shown in Fig. 19. These blades are operated in unison by means of a pin 250 projecting laterally from the plunger piston through a longitudinal slot 251 in the side of the cylindrical portion of the casing 219, the said pin on the advance of the plunger piston, engaging the inner ends of arms 252 of two elbow levers 253 pivoted as at 254 to the side of the casing, the other arms 255 of which elbow levers are connected together by a tension spring 254ˣ. The two arms 252 are connected with the respective blades by means of links 256 pivoted at their opposite ends to said parts. Normally, when the plunger is in its retracted position, the pin thereon is free of the ends of the arms 252, and the latter will be held by the spring in an upper position with the two blades raised as shown in Fig. 18, and above the guiding slot through which the strip material passes. When now the plunger advances in the action of the punch to punch out a bottom from the strip material, the pin 250 engaging the inner ends of arms 252 will swing them down as shown in Fig. 19, and this action will swing the two blades down and across the guiding slot, and the knife edges will cut through the two portions of the strip at the sides of the previously formed hole, and the waste portion of the strip will be severed from the body portion. On the retreat of the plunger, the pin will disengage the arms, and the spring will act to restore the parts to their former positions.

It will be understood that the cutting mechanisms of the two punching mechanisms occupying respectively positions 5ᶻ and 7ᶻ (Fig. 30), will be operated in unison in proper co-ordination with the operation of the punching mechanisms as hereinbefore described.

After the first bottom 16 has been inserted by the operation of the punching mechanism at position 5ᶻ, Fig. 30 the mandrel carrying spider makes a further movement and carries the mandrel from position 5ᶻ to position 6ᶻ, in which action the wound blanks on the mandrel will enter the socket in the upper rocking clamping head 154, and in the continued movement of the mandrel, the head will be rocked to a central position and forced upwardly thereby compressing the spring, and the mandrel will come to rest with the clamping head in a central position and pressing firmly on the wound blanks in a direction radially of the axis of the spider, this action of the clamping head being similar in all respects to that of the clamping head 154 before described in detail. While the blanks on the mandrel are thus held by the clamping head with their ends in the condition shown at 5$^x$, Fig. 31, that is with the bottom 16 seated against the inturned end of the inner blank, and the end of the outer blank projecting beyond the inturned end of the inner blank, the upper spinning head 167 comes into action and operating on the projecting end of the outer blank, it will act to fold or turn the same inwardly as shown at 6$^x$, Fig. 31, whereby the bottom 16 will be locked firmly in place and seated tightly against the inturned end of the inner blank.

The mandrel carrying spider now makes a further advance and the mandrel disengages the upper rocking clamping head 154, and the latter is returned by its spring 164 to its former position shown by dotted lines, ready to receive the next advancing mandrel, and the previously clamped mandrel moves to position 7$^z$, Fig. 30, where it comes to rest. In this position, the punching mechanism for punching the second bottom 21 is operated, and punches out the bottom and seats the same within the inturned end of the second blank as shown at 7$^x$, Fig. 31. This completes the formation of the carton and it is ready to be ejected from the mandrel. The ejection takes place at position 8$^z$, to which the mandrel with the completed carton is carried in the next advance of the mandrel carrying spider.

The ejector consists of two fingers 257 which are oppositely curved so as to seat in the opposite notches 7$^e$ in the mandrel, the fingers when seated in these notches lying behind and within the plane of the inner open end of the finished carton, the edge of which carton abuts against the lugs 7$^f$. As a result, when the fingers are drawn forwardly longitudinally of the mandrel, they will push the carton before them and strip the same from the mandrel.

The fingers are carried by two parallel arms 258 which are rigidly connected together in fixed spaced relations by means of a cross-connecting piece 259 at their inner ends, and they are journalled at this point on a stud 260 sustained by bracket arms 261 projecting outwardly in opposite directions from a slide or block 262. The construction is such that by swinging the arms on their pivotal axis, the ejecting fingers will be swung towards the mandrel and seated in the notches therein as shown in Fig. 22, or they may be swung away from the mandrel free of the same as shown in Fig. 21. The slide 262 is mounted to move back and forth on a track bar 263 fixedly sustained by the machine frame and extending along the outer side of the mandrel occupying position 8$^z$, Fig. 30, and the slide is moved back and forth on its track bar and the ejector fingers rocked to and from the mandrel, by means of an actuating link 264, the inner end of which is pivoted to a stud 265 fixed to and projecting laterally from the cross connecting piece 259, and the outer end of which link is pivoted to a crank arm 266 on the end of a shaft 267 mounted in bearings 268 sustained by the machine frame. The shaft has a bevel gear 269 fixed to it, with which meshes a bevel pinion 270 on a counter-shaft 271 mounted in suitable bearings on the machine frame, and having on its opposite end a sprocket wheel 272 around which passes a sprocket chain 273 which also passes around a sprocket wheel 274 on the horizontal shaft 148 before alluded to. An arm 275 extends laterally from the slide 262 and is provided with spaced fingers 276 which bear on the opposite sides of the shaft 271 before alluded to, and a leaf spring 278 is seated between the shaft and the arm to set up frictional resistance to the movement of the slide on the track bar.

In the operation of the ejector, the rotation of the crank arm 266 will reciprocate the actuating link 264 endwise, and this in turn will shift the slide back and forth on the track bar and thereby seat the ejecting fingers in the notches in the mandrel and draw fingers endwise and eject the carton. Assuming the parts to be in the position shown in Fig. 21, as the crank arm swings around and draws the actuating link outwardly, the first action, due to the resistance offered by the leaf spring to the movement of the slide, will be to swing the arms 258 on their pivotal axis, thereby moving the ejecting fingers inwardly and seating the same in the notches in the mandrel and behind the rear end of the carton. The second action, on the continued movement of the actuating slide, will overcome the friction of the leaf spring and will draw the ejector fingers towards the forward end of the mandrel, (see dotted lines Fig. 22) and thereby strip the carton from the mandrel and the carton will drop from the machine. The crank arm now begins its return movement, and the first action will be to swing the arms 258 back again away from the mandrel, due to the resistance of the leaf spring, and the continued movement of the crank arm will overcome the resistance of the spring and will restore the arms and ejector fingers to their former positions free of the mandrel and at the rear end of the same as shown in Fig. 21.

Intermittent rotary motion is imparted to the mandrel carrying spider in the present instance by the driving mechanism shown more particularly in Figs. 14, 15, and 25, where it will be seen that there is fixed to the shaft 10 carrying the spider a wheel 279 of a Geneva movement which wheel is spaced from and in rear of the spider. This wheel is provided in its periphery with a series of radial open slots 280 corresponding in number to the number of mandrels, and between the slots the wheel is formed with a series of peripheral depressions 281. The shaft 199 hereinbefore referred to, is extended inwardly beyond its inner bearing in the frame as shown at Fig. 14, and it has fixed to its inner end a crank arm 282 on the outer end of which is journalled a roller 283, which, as the crank arm is rotated by the shaft, will enter the open radial slots 280 in succession and will turn the wheel step by step. At its inner end the crank arm has fixed to it coincident with the axis of the shaft, a segmental locking disc 284 whose periphery is curved to correspond to the curvature of the depressions 281, and as the crank arm is rotated, this member is swung around and seated in the successive depressions between the radial slots. In the operation of the parts, the shaft carrying the crank arm is rotated continuously and the roller 283 is caused to engage in the successive slots in the wheel 279, thereby moving the wheel step by step, the locking member, as the roller is leaving one slot, entering the following depression and acting to hold the wheel at rest while being rotated in the depression, the roller being caused to enter the next slot at the moment that the locking member disengages the depression. As a result of this operation, the wheel, and consequently the mandrel carrying spider will be rotated step by step and will be held fixedly at rest between each advancing movement, during which pauses, the winding, spinning, punching and ejector mechanisms hereinbefore described, are performing their operations on the motionless mandrels. The shaft 199 as before described, is rotated from the main driving shaft through the train of gears 182, 181, 201 and 200.

The flexing fingers, advancing fingers, and the blank feeding mechanisms for the two sets of blanks, are operated in unison with each other from the main driving shaft through the medium of two horizontal transverse shafts 286 and 286ª which are mounted in suitable bearings beneath the drums 76 respectively, and as the driving devices operated by these two shafts are the same for the feeding mechanism at both ends of the machine, a description of one set will suffice. At one end the shaft 286 has fixed to it a sprocket wheel 287 (Fig. 8), around which passes a sprocket chain 288 which also passes around the upper side of a sprocket wheel 289 on shaft 111, over an idler sprocket wheel 290, over a sprocket wheel 291 on the adhesive distributing roller 100 and over a sprocket wheel 292 on the drum 76, whereby all of the parts are rotated in a direction to cause them to operate in the manner hereinbefore described, it being understood, that similar driving devices are similarly operated by the sprocket wheel on the end of the other shaft 286ª, so that the blanks from the two holders 5 and 6 will be fed to the positioned mandrels in unison with each other.

On their opposite ends the shafts 286 and 286ª are provided respectively with bevel gears 293 and 293ª, the bevel gear 293 being engaged by a gear 294 on a shaft 295, and the gear 293ª being engaged by a gear 296 on the shaft 295, as shown in Fig. 15. This shaft 295 extends longitudinally of the machine, and has fixed to it a driving bevel gear 296ˣ, which is engaged by a bevel pinion 297 on the inner end of shaft 180 before alluded to, which it will be remembered is driven from the main driving shaft by the spur pinions 181 and 182, Fig. 14.

The paper blanks employed in forming the cartons will be of a thickness or weight suitable for the particular character of carton to be produced and its intended uses; and the two series of blanks A and B may be of the same thickness or of relatively different thicknesses according to the requirements. The formation of the carton of two separate blanks wound one upon the other, enables the blanks B to be printed upon or otherwise marked or ornamented before being placed in the machine and wound on the mandrels, the holder for the blanks B being for this purpose furnished with a supply of printed blanks, which in the operation of the machine will be wound upon the blanks A with the printed sides exposed. In such cases the blanks A could be of comparatively thick or heavy paper to form the body of the carton and give it the necessary strength, and the blanks B could be of much thinner paper to receive and display the printing and give the carton a finished appearance.

In the foregoing description and accompanying drawings while I have disclosed my invention embodied in certain detailed form and arangement of parts it will be manifest to the skilled mechanic that these details may be changed and modified in various ways without departing from the limits of my invention; and it will be understood that the invention is not limited to any particular form or construction of the parts except in so far as such limitations are specified in the claims. Matters and features disclosed herein but not claimed have been made the subject of a divisional application filed September 24, 1921, Serial No. 502,980.

Having thus described my invention what I claim is:

1. In a machine of the type described, the combination of a mandrel, means acting at one position of the mandrel for applying a blank therearound, means for advancing the mandrel bodily to another position in the machine, and means for applying a second blank on the mandrel around the first in the advanced position of the mandrel.

2. In a machine of the type described, the combination of a plurality of mandrels, mechanism for feeding separate blanks to each mandrel, and means for winding the blanks around each mandrel in succession in superposed relation.

3. In a machine of the type described, the combination of two blank feeding means, a mandrel movable to operative relation to said feeding means in succession, and blank winding means associated with the respective feeding means and operable on the fed blanks to wind them around the mandrel one upon the other.

4. In a machine of the type described, the combination of two blank feeding means, a plurality of mandrels movable each to operative relation to said feeding means in succession, and blank winding means associated with the respective feeding means and operable on the fed blanks to wind them around the mandrels one upon the other.

5. In a machine of the type described, the combination of a series of mandrels, a carrier for the same, means for moving the carrier intermittently to present the mandrels successively to different definite positions, mechanism for feeding separate blanks to each mandrel respectively in its different positions, and means for winding the blanks in succession around each mandrel in superposed relation.

6. In a machine of the type described, the combination of a mandrel, mechanism for feeding blanks to two different points in the machine, means for positioning the mandrel at said points in succession, and means for winding a blank around the mandrel in each of its two positions; whereby two blanks will be wound around the mandrel in superposed relation.

7. In a machine of the type described, the combination of two blank holders, blank feeding means associated with each holder, a mandrel movable past the two feeding means, and means for winding the invidual blanks around the mandrel as it is presented successively to the respective feeding means.

8. In a machine of the type described, the combination of two blank holders, blank feeding means associated with each holder, a series of mandrels, a carrier for the same, means for moving the carrier to position the mandrels in successive relation to the two feeding means, and two means for winding the individual blanks on the position mandrels; whereby each mandrel will have two blanks wound upon it in superposed relation.

9. In a machine of the type described, the combination of a plurality of mandrels, a carrier for the same, two blank winding mechanisms, means for operating the carrier to position pairs of mandrels successively in operative relation to the two winding mechanisms, and means for operating the winding mechanisms in unison; whereby the blanks will be wound simultaneously around the mandrels of a pair.

10. In a machine of the type described, the combination of blank feeding means, blank winding means including a rotary winding roll located in a permanent predetermined position in the machine, and a mandrel movable into operative relation to the winding roll so that the fed blank will be entered in the bight of the roll and mandrel and be wound around the latter.

11. In a machine of the type described, the combination of blank feeding means, blank winding means including opposed rotary rolls, and a mandrel movable to a position between the rolls so that the fed blank will be entered in the bight of a roll and the mandrel and will be wound around the latter.

12. In a machine of the type described, the combination of a mandrel, and means for winding a blank therearound, said winding means including a wiping member which acts on the blank with a wiping effect as it is wound around the mandrel.

13. In a machine of the type described, the combination of blank feeding means, blank winding means including two rotary rolls spaced apart from each other, means for driving one roll at a higher speed than the other, and a mandrel movable to a position between the rolls so that the blank will be entered in the bight of the slower running roll and mandrel and be wound around the latter.

14. In a machine of the type described, the combination of blank feeding means, blank winding means comprising a rotary winding roll and an opposed rotary wiping roll, and a mandrel movable to a position between the rolls so that the fed blank will be entered in the bight of the winding roll and mandrel and be wound around the latter.

15. In a machine of the type described, the combination of blank feeding means, a cylindrical mandrel movable past and adapted to be positioned in relation to the blank feeding means, and blank winding means including a blank guiding member curved to direct the blank around the positioned mandrel, said guiding member being movable out of the path of the mandrel to permit the same to move past the feeding means.

16. In a machine of the type described, the combination of blank feeding means, a cylindical mandrel movable past and adapted to be positioned relative to the blank feeding means, and blank winding means including opposed curved guiding members movable towards each other to embrace the positioned mandrel to guide the blank therearound, and means for moving the guiding members away from each other out of the path of movement of the mandrel to permit the same to move past the feeding means.

17. In a machine of the type described, the combination of blank feeding means, a cylindrical mandrel movable past and adapted to be positioned relative to the feeding means, blank winding means including curved opposing gangs of guiding fingers, and means for moving said gangs towards each other to embrace the positioned mandrel to guide the blank therearound, and for moving said gangs away from each other out of the path of the mandrel, to permit the latter to move past the feeding means.

18. In a machine of the type described, the combination of blank feeding means, a cylindrical mandrel movable past and adapted to be positioned in relation to the feeding means, and blank winding means comprising a rotary winding roll in position to act on the fed blank and advance the same around the positioned mandrel, and a curved blank guiding member to guide the blank advanced by the winding roll, said guiding member being movable out of the path of the mandrel to permit the latter to move past the feeding means.

19. In a machine of the type described, the combination of blank feeding means, a cylindrical mandrel movable past and adapted to be positioned in relation to the feeding means, and blank winding means comprising opposed rotary rolls to advance the blank around the mandrel and between which the mandrel is positioned, and opposed curved blank guiding members adapted to embrace the positioned mandrel in the opposing spaces between the rolls to guide the blank as it is advanced by the rolls, said guiding members being movable away from the mandrel out of the path of the same to permit it to pass the feeding means.

20. In a machine of the type described, the combination of blank feeding means, a mandrel movable past and adapted to be positioned relative to the feeding means, blank winding means including a curved blank guiding members movable to operative relation to the positioned mandrel to guide the blank therearound, and movable away from the mandrel out of the path of the same to permit the mandrel to move past the feeding means, and operating mechanisms for the mandrel and blank guiding member, said mechanisms being coordinated with each other to cause the guiding member to move to operative relation to the mandrel after the latter is positioned in operative relation to the feeding means, and to move away from the mandrel before the latter moves past the feeding means.

21. In a machine of the type described, the combination of blank feeding means operable to feed the blanks in succession, a series of mandrels, a carrier therefor movable to position the mandrels successively in relation to the feeding means, blank winding means including a curved blank guiding member movable successively to operative relation to the positioned mandrels to guide the blanks therearound, and movable away from the positioned mandrels to permit the latter to move past the feeding means and the following mandrel to be positioned, and operating mechanisms for the mandrel carrier and the blank guiding member, said mechanisms being coordinated with each other to cause the guiding member to move away from the positioned mandrel when the latter moves past the feeding means, and to move up to operative relation to the following mandrel when the latter is positioned relative to the feeding means.

22. In a machine of the type described, the combination of blank feeding means operable to feed the blanks in succession, a series of mandrels, a carrier therefor movable to position the mandrels relative to the feeding means in succession, blank winding means including a curved blank guiding member movable successively to operative relation to the positioned mandrels to guide the blanks therearound, and movable away from the positioned mandrels to permit the latter to move past the feeding means and the following mandrel to be positioned, and operating mechanisms for the feeding means, mandrel carrier, and winding means, said mechanisms being coordinated with each other to cause the guiding member to move up to a mandrel after the latter is positioned and before the fed blank is acted on by the winding means, and to move away from the mandrel before the following mandrel is positioned.

23. In a machine of the type described, the combination of a mandrel, blank winding mechanism associated therewith, blank feeding mechanism operable to advance the blanks in succession to the winding mechanism, the said feeding and winding mechanisms being so related to each other that the blank will be acted on by the winding mechanism before it is disengaged by the feeding mechanism.

24. In a machine of the type described, the combination of a mandrel, and blank winding means associated therewith, blank feeding mechanism operable to advance the blanks in succession to the winding means, said feeding mechanism including a rotary feeding drum and a cooperating presser roller acting to press the blank against the drum, and the said parts being so related that the blank will be engaged by the winding means before it disengages the feeding drum and presser roller.

25. In a machine of the type described, the combination of a mandrel, means for winding separate blanks therearound in superposed relation, means for applying adhesive to the first blank for a portion of its surface before it is wound upon the mandrel, and means for applying adhesive to the second blank throughout its surface before it is wound upon the first blank.

26. In a machine of the type described, the combination of a mandrel, mechanism for feeding separate blanks thereto one after the other, the first blank being of a length to wholly surround the mandrel and overlap the surrounding portion, means for applying an adhesive to the overlapping portion only of the blank, means for winding said blank around the mandrel, means for applying adhesive to the second blank, and means for winding the latter around the first blank.

27. In a machine of the type described, the combination of a mandrel, mechanism for feeding separate blanks thereto each of a size to surround the mandrel in two convolutions, means for applying an adhesive to that portion only of the first blank which will form the second convolution, means for winding said blank around the mandrel, means for applying adhesive to the entire surface of the second blank, and means for winding the second blank around the first.

28. In a machine of the type described, the combination of a mandrel, mechanism for feeding separate blanks thereto, means for winding the blanks successively around the mandrel in superposed relation, and means for folding in the end of the first blank between the two winding operations.

29. In a machine of the type described, the combination of a mandrel, mechanism for winding a blank therearound, means for folding in the end of the wound blank, and means for winding a second blank around the first.

30. In a machine of the type described, the combination of a mandrel, means for winding separate blanks around the same, one surrounding the other, and means for folding in the end of the first wound blank to form an annular shoulder within the second blank.

31. In a machine of the type described, the combination of two blank winding mechanisms, an intermediate blank spinning mechanism, means for feeding separate blanks to the respective winding mechanisms, a mandrel, and means for presenting the same in operative relation successively to the first winding mechanism, the spinning mechanism, and the second winding mechanism; whereby two blanks will be wound around the mandrel in superposed relation with the end of the first blank folded in.

32. In a machine of the type described, the combination of two blank winding mechanisms, an intermediate blank spinning mechanism, and means for feeding separate blanks to the respective winding mechanisms, together with a series of mandrels, a carrier for the same movable relatively to said mechanisms, and means for moving the carrier to position the mandrels one after the other in operative relation to the said mechanisms in succession.

33. In a machine of the type described, the combination of a mandrel, means acting at one position of the mandrel to apply a blank therearound, means for advancing the mandrel and applied blank to another position in the machine, a spinning mechanism adapted to act in the advanced position of the mandrel on the end of the blank, and a blank clamping means located permanently at said advanced position of the mandrel and operable to hold the blank while being acted on by the spinning mechanism.

34. In a machine of the type described, the combination of a non-expansible mandrel, means for winding a blank therearound, mechanism for operating on the end of the wound blank on the mandrel, and means adapted to act on the exterior of the blank and hold it fixedly while being operated on by said mechanism.

35. In a machine of the type described, the combination of a non-expanding mandrel, means for winding a blank therearound, mechanism for operating on the end of the wound blank on the mandrel, and means independent of the mandrel for holding the blank fixedly while being operated on by said mechanism.

36. In a machine of the type described, the combination of a non-expansible mandrel, a carrier for the same on which the mandrel is mounted to turn freely on its longitudinal axis, means for winding a blank around the mandrel, mechanism for operating on the end of the wound blank on the mandrel, and means adapted to act on the blank and hold the same fixedly on the mandrel and hold the mandrel fixedly on its axis while the blank is being operated on by said mechanism.

37. In a machine of the type described, the combination of blank winding mechanism, means for feeding blanks thereto, a blank spinning mechanism, a mandrel, means for presenting the mandrel in operative relation to said mechanisms in succession, and a clamping head in position to act on the wound blank while being operated on by the spinning mechanism.

38. In a machine of the type described, the combination of blank winding mechanism, means for feeding the blanks thereto, a blank spinning mechanism, a mandrel carrier, a mandrel mounted thereon to rotate freely about its longitudinal axis, means for moving the carrier to present the mandrel in operative relation to said mechanisms in succession, and a clamping member in position to act on the wound blank on the mandrel and hold the mandrel from turning while the blank is operated on by the spinning mechanism.

39. In a machine of the type described, the combination of blank winding mechanism, means for feeding blanks thereto, a blank spinning mechanism, a mandrel, means for presenting the mandrel in operative relation to said mechanisms in succession, and a spring pressed clamping head in position to act on the wound blank while being operated on by the spinning mechanism.

40. In a machine of the type described, the combination of blank winding mechanism, means for feeding blanks thereto, a blank spinning mechanism, a mandrel, means for presenting said mandrel in operative relation to the winding mechanism, means for moving the mandrel with the blank thereon to operative relation to the spinning mechanism, and a movable clamping head provided with a socket to receive the wound blank on the mandrel, said head being normally in position to receive the wound blank as the mandrel approaches the spinning mechanism, and being moved by the mandrel to clamping position as the mandrel arrives at its operative relation to the spinning mechanism.

41. In a machine of the type described, the combination of blank winding mechanism, means for feeding blanks thereto, a blank spinning mechanism, a mandrel, means for presenting the mandrel into operative relation to the winding mechanism and for moving the mandrel with the blank wound thereon to operative relation to the spinning mechanism, a movable clamping head provided with a socket to receive the wound blank on the mandrel, said head being normally in position to receive the blank as the mandrel approaches the spinning mechanism, and being moved by the mandrel to clamping position as the mandrel moves up to operative relation to the spinning mechanism, and a pressure spring associated with the clamping head and arranged to be placed under tension by the movement of the head to clamping position; whereby the clamping head will act on the blank with a yielding pressure.

42. In a machine of the type described, the combination of blank winding mechanism, means for feeding blanks thereto, a blank spinning mechanism, a mandrel movable in a definite path into operative relation to said mechanisms, and a spring pressed movable clamping device associated with the spinning mechanism to hold the blank on a mandrel while being operated on by the spinning mechanism, said clamping device being arranged in the path of the mandrel to be moved thereby to compress the spring as the mandrel moves to operative relation to the spinning mechanism.

43. In a machine of the type described, the combination of blank winding mechanism, means for feeding blanks thereto, a blank spinning mechanism, a mandrel movable in a defined path into operative relation to said mechanisms, and a yielding clamping head associated with the spinning mechanism to hold the blank while being operated on by the spinning mechanism, said clamping head being arranged in the path of the mandrel to be engaged thereby and caused to yield as the mandrel assumes its operative relation to the spinning mechanism.

44. In a machine of the type described, the combination of blank winding mechanism, means for feeding blanks thereto, a blank spinning mechanism, a mandrel, means for moving the mandrel in a defined path from the winding mechanism to and past the spinning mechanism, a clamping head associated with the spinning mechanism to act on the blank while being operated on by the spinning mechanism, said head being rockable in the direction of movement of the mandrel, and arranged in the path of the same; whereby the blank on the mandrel in its movement to and past the spinning mechanism will successively engage the clamping head, will be held thereby and will finally disengage the same.

45. In a machine of the type described, the combination of blank winding mechanism, means for feeding the blanks thereto, a blank spinning mechanism, a mandrel, means for moving said mandrel in a defined path from the winding mechanism to and past the spinning mechanism, a clamping head associated with the spinning mechanism to act on the wound blank while being operated upon by the spinning mechanism, said head being pivotally mounted on an axis extending transversely of the movement of the mandrel to enable the head to rock in the direction of said movement, and a spring acting on the head and holding it tipped on its axis in the path of movement of the mandrel; whereby the engagement of the mandrel with the head will rock the same to clamping position and thereby extend the spring which latter will automatically return the head to its former tipped position when disengaged by the mandrel as the latter leaves the spinning mechanism.

46. In a machine of the type described, the combination of blank winding mechanism, means for feeding blanks thereto, a blank spinning mechanism, a mandrel, means for moving the mandrel in a definite path from the winding mechanism to the spinning mechanism, a socketed clamping head associated with the spinning mechanism to embrace the wound blank on the mandrel and hold it while being operated upon by the spinning mechanism, said head being movable to and from the path of movement of the mandrel, and a spring acting on the head and urging it in said path; whereby the mandrel in assuming its operative relation to the spinning mechanism will enter the socket in the head and shift it in opposition to the force of the spring.

47. In a machine of the type described, the combination of blank winding mechanism, means for feeding blanks thereto, a blank spinning mechanism, a mandrel, means for moving the same in a definite path from the winding mechanism to the spinning mechanism, and a clamping member associated with the spinning mechanism to act on and hold the blank while being operated on by the spinning mechanism, said clamping member comprising a socketed head pivotally mounted to rock back and forth in the direction of movement of the mandrel and being movable bodily transversely of the movement of the mandrel, a spring acting on the head and serving to hold it yieldingly in tipped position in the path of the mandrel, and a second spring acting on the head and controlling its bodily movement transversely of the path of the mandrel.

48. In a machine of the type described, the combination of a mandrel, means for winding separate blanks around the same, one surrounding the other, means for folding in the end of the first wound blank to form an annular shoulder within the second blank, and means for seating a bottom within the second blank and against the folded in end of the first blank.

49. In a machine of the type described, the combination of a mandrel, means for winding separate blanks around the same, one surrounding the other, means for folding in the end of the first wound blank to form an annular shoulder within the end of the second blank, means for seating a bottom within the second blank and against the folded in end of the first blank, and means for folding in the end of the second blank to confine the bottom in place.

50. In a machine of the type described, the combination of a mandrel, means for winding separate blanks around the same, one surrounding the other, means for folding in the end of the first wound blank to form an annular shoulder within the second blank, means for seating a bottom within the second blank and against the folded in end of the first blank, means for folding in the end of the second blank to confine the bottom in place, and means for seating a second bottom within the folded in end of the second blank to prevent the same from unfolding.

51. In a machine of the type described, the combination of blank winding mechanism, a blank spinning mechanism, a second winding mechanism, a bottom seating mechanism, a second blank spinning mechanism, and a second bottom seating mechanism, said several mechanisms being arranged in the machine in the order mentioned, a mandrel and means for presenting said mandrel in operative relation to said mechanisms in succession, together with means for operating said several mechanisms; whereby two blanks will be wound around the mandrel in superposed relation, the end of the first blank folded in, a bottom seated against the folded in end, a second blank folded in to confine the bottom, and a second bottom seated in the folded in end of the second blank to prevent unfolding.

52. In a machine of the type described, the combination of a blank winding mechanism, a blank spinning mechanism, a second blank winding mechanism, a bottom seating mechanism, a second blank spinning mechanism, and a second bottom seating mechanism, means for operating said several mechanisms in unison, a series of mandrels, a carrier for the same, and means for operating the carrier to present the individual mandrel one after the other into operative relations to the said mechanisms in succession.

53. In a machine of the type described, the combination of a plurality of mandrels, a carrier for the same, two blank winding mechanisms, two blank spinning mechanisms, means for operating the carrier to position pairs of mandrels with blanks thereon successively in operative relation to the two spinning mechanisms, and means for operating the spinning mechanisms in unison.

54. In a machine of the type described, the combination of a plurality of mandrels, a carrier for the same, two blank winding mechanisms, means for operating the same, two blank spinning mechanisms, means for operating the same, two bottom seating mechanisms, means for operating the carrier to simultaneously position pairs of mandrels with folded in blanks thereon successively in operative relation to the two bottom seating mechanisms, and means for operating said bottom seating mechanisms in unison.

55. In a machine of the type described, the combination of a blank winding mechanism, a bottom punching mechanism, means for feeding a strip of bottom forming material to the action of the punching mechanism, a severing knife operated by the punching mechanism to sever the waste strip material, a mandrel, and means for presenting the mandrel in operative relation successively to the winding mechanism and the bottom punching mechanism.

56. In a machine of the type described, the combination of a blank winding mechanism, a bottom punching mechanism, means for feeding a strip of bottom forming material to the action of the punching mechanism, means operating in unison with one punching action to sever the waste strip material produced by the previous punching action, a mandrel and means for presenting the mandrel in operative relation successively to the winding mechanism and the punching mechanism.

57. In a machine of the type described, the combination of a blank winding mechanism, a bottom punching mechanism including a punch adapted on its advance to act on bottom forming material and punch a bottom from the same, means for feeding a strip of bottom forming material to the action of the punch, a movable knife arranged adjacent the punch for severing the waste strip material, said knife being arranged to be operated by the advance of the punch in the punching action, a mandrel, and means for presenting said mandrel in operative relation successively to the winding mechanism and the punching mechanism.

58. In a machine of the type described, the combination of a blank winding mechanism, a bottom punching mechanism including a circular cutting die operable to punch circular bottoms successively from bottom forming material, means for feeding a strip of bottom forming material to the action of the die, a knife operable to sever the intact portions of the strip at the sides of the hole formed by the cutting die, a mandrel, and means for presenting the mandrel in operative relation successively to the winding mechanism and the punching mechanism.

59. In a machine of the type described, the combination of a blank winding mechanism, a bottom punching mechanism including a circular cutting die operable to punch circular bottoms successively from bottom forming material, means for feeding a strip of bottom forming material to the action of the cutting die, whereby holes will be formed in the strip in the successive actions of the die, a strip severing mechanism including two cutting blades mounted adjacent to the cutting die and being movable to sever the strip respectively through the intact portions at the opposite sides of the hole, together with a mandrel, and means for presenting the mandrel in operative relation successively to the winding mechanism and the punching mechanism.

60. In a machine of the type described, the combination of a blank winding mechanism, a bottom punching mechanism comprising a circular reciprocating cutting die adapted on its advance to punch circular bottoms successively from bottom forming material, together with means for feeding a strip of bottom forming material to the action of the die, whereby holes will be formed in the strip in the successive actions of the die, a strip severing mechanism including two cutting blades pivotally mounted to swing transversely of the strip and sever the same through the intact portions thereof at the sides of the hole, actuating levers operatively connected with said blades, means adapted on the advance of the cutting die to engage said levers and actuate the blades, a mandrel, and means for presenting the mandrel in operative relation successively to the winding mechanism and the punching mechanism.

61. In a machine of the type described, the combination of blank winding mechanism, a bottom punching mechanism comprising a reciprocating cutting die adapted on its advance to act on bottom forming material and punch bottoms therefrom, a reciprocating actuating plunger for the die, and a motion transmitting member interposed between the plunger and die and formed to yield in the event of undue obstruction being offered to the advance of the die, together with means for feeding bottom forming material to the action of the die, a mandrel, and means for presenting the mandrel in operative relation to the winding mechanism and the punching mechanism.

62. In a machine of the type described, the combination of a blank winding mechanism, a bottom forming mechanism comprising a reciprocating punching die provided with a stem and with a longitudinal slot, an actuating plunger for said die formed with a guide opening in which the stem is mounted for longitudinal movement, an expansion spring surrounding the stem within the opening of the plunger and bearing at its ends respectively against the guide and plunger, a pin carried by the plunger and extending in said longitudinal slot in the die, together with means for reciprocating the plunger, means for feeding bottom forming material to the action of the die, a mandrel, and means for presenting the mandrel in operative relation succcessively to the winding mechanism and the bottom forming mechanism.

63. In a machine of the type described, the combination of a mandrel, means for winding a blank around the same to form a tubular carton, an ejecting device normally free of the mandrel and movable towards the same into operative ejecting relation to the rear end of the carton, and means for moving said ejecting device longitudinally of the mandrel to eject the carton therefrom.

64. In a machine of the type described, the combination of a mandrel, means for winding a blank around the same to form a tubular carton, an ejecting device comprising two ejecting fingers normally free of the mandrel and movable towards the same to extend on opposite sides of the mandrel into operative ejecting relation to the end of the carton, and means for moving said ejecting fingers longitudinally of the mandrel to eject the carton therefrom.

65. In a machine of the type described, the combination of a cylindrical mandrel, means for winding a blank around the same to form a tubular carton, an ejecting finger curved to conform to the curvature of the mandrel and normally free of the same, said finger being movable towards the mandrel into operative ejecting relation to the end of the carton, and means for moving the ejecting finger longitudinally of the mandrel to eject the carton therefrom.

66. In a machine of the type described, the combination of a mandrel, means for winding a blank around the same to form a carton, a slide movable longitudinally of the mandrel, an ejecting finger pivoted to the slide to move from a position free of the mandrel to a position in operative ejecting relation to the end of the carton, and a slide actuating member operatively connected with the ejecting finger to control its pivotal movements.

67. In a machine of the type described, the combination of a mandrel, means for winding a blank around the same to form a carton, a slide movable longitudinally of the mandrel, an ejecting finger pivoted to the slide to move to and from the mandrel, and an actuating member for moving the slide longitudinally, said member being operatively connected with the ejecting finger to control its movements to and from the mandrel.

68. In a machine of the type described, the combination of a mandrel, means for winding a blank around the same to form a carton, a slide movable longitudinally of the mandrel, an arm pivoted at its inner end to the slide and provided at its outer end with an ejecting finger to engage behind the end of the carton, a stud fixed to said arm, and a slide actuating link pivoted to the stud.

69. In a machine of the type described, the combination of a mandrel, means for winding a blank around the same to form a carton, a slide movable longitudinally of the mandrel, an ejecting device pivoted to the slide to move freely to and from the mandrel, a link connected to the ejecting device and movable to rock the ejecting device on its axis and move the slide longitudinally, and means for producing frictional resistance to the movement of the slide.

70. In a machine of the type described, the combination of a mandrel, means for winding a blank around the same to form a carton, said mandrel being provided with a gage lug to determine the position of the carton on the mandrel, an ejecting device adapted to be positioned at the side of the lug behind the end of the carton, and means for moving the ejecting device longitudinally of the mandrel to eject the carton therefrom.

71. In a machine of the type described, the combination of a mandrel, means for winding a blank around the same to form a carton, said mandrel being provided with a series of gage lugs with spaces between them, to determine the position of the carton thereon, an ejecting device comprising two ejecting fingers adapted to be positioned in the spaces between the lugs in rear of the end of the carton, and means for moving the ejecting fingers longitudinally of the mandrel to eject the carton therefrom.

72. In a machine of the type described, the combination of a mandrel, a carrier for the same on which the mandrel is mounted to rotate freely about its longitudinal axis, a blank winding mechanism operable on the mandrel to rotate the same and wind the blank therearound to form a carton, the said mandrel being provided with a gage lug to determine the position of the wound blank on the mandrel, a carton ejecting finger sustained in the machine at a point removed from the winding mechanism, said ejecting finger being adapted to be positioned relative to the mandrel at the side of the gage lug and behind the end of the carton, means for moving the carrier to position the mandrel in operative relation to the ejecting device, means for turning the mandrel on its axis to set the gage lug so that the ejecting device can be positioned at the side of the same, and means for moving the ejecting device longitudinally of the mandrel to eject the carton therefrom.

73. In a machine of the type described, the combination of blank feeding means, a mandrel movable past and adapted to be positioned in relation to the blank feeding means, and blank winding means including a blank guiding member formed to direct the blank around the positioned mandrel, said guiding member being movable out of the path of the mandrel to permit the same to move past the feeding means.

74. In a machine of the type described, the combination of a blank winding mechanism, a bottom punching mechanism, means for feeding bottom forming material to the action of the punching mechanism, a severing knife to sever the waste strip material, means for operating said knife, a mandrel, and means for presenting the mandrel in operative relation to the winding mechanism and the bottom punching mechanism.

In testimony whereof, I have affixed my signature hereto.

GEORGE W. BEADLE.